US012684155B2

(12) United States Patent
Chen et al.

(10) Patent No.:     US 12,684,155 B2
(45) Date of Patent:         Jul. 14, 2026

(54) METHOD AND NON-TRANSITORY COMPUTER READABLE STORAGE MEDIUM FOR VIDEO GENERATIVE COMPRESSION

(71) Applicant: Alibaba Innovation Private Limited, Singapore (SG)

(72) Inventors: Jie Chen, Beijing (CN); Yan Ye, San Diego, CA (US); Bolin Chen, Kowloon Tong (HK)

(73) Assignee: Alibaba Innovation Private Limited, Singapore (SG)

( * ) Notice: Subject to any disclaimer, the term of this patent is extended or adjusted under 35 U.S.C. 154(b) by 50 days.

(21) Appl. No.: 18/628,002

(22) Filed: Apr. 5, 2024

(65) Prior Publication Data

US 2024/0348816 A1      Oct. 17, 2024

Related U.S. Application Data

(60) Provisional application No. 63/511,897, filed on Jul. 5, 2023, provisional application No. 63/496,049, filed on Apr. 14, 2023.

(51) Int. Cl.
| | |
|---|---|
| *H04N 19/463* | (2014.01) |
| *H04N 19/136* | (2014.01) |
| *H04N 19/169* | (2014.01) |
| *H04N 19/172* | (2014.01) |
| *H04N 19/184* | (2014.01) |

(52) U.S. Cl.
CPC ......... *H04N 19/463* (2014.11); *H04N 19/136* (2014.11); *H04N 19/172* (2014.11); *H04N 19/184* (2014.11); *H04N 19/188* (2014.11)

(58) Field of Classification Search
CPC .. H04N 19/463; H04N 19/136; H04N 19/172; H04N 19/184; H04N 19/188; H04N 19/46; H04N 19/70
See application file for complete search history.

(56) References Cited

U.S. PATENT DOCUMENTS

| | | |
|---|---|---|
| 2016/0212439 A1 | 7/2016 | Hannuksela |
| 2022/0217386 A1 | 7/2022 | Wang |
| 2024/0357180 A1* | 10/2024 | Hendry ................. H04N 19/70 |

FOREIGN PATENT DOCUMENTS

| | | |
|---|---|---|
| CN | 114205609 A | 3/2022 |

OTHER PUBLICATIONS

Blanz et al., "A morphable model for the synthesis of 3d faces," in Proceedings of the 26th annual conference on Computer graphics and interactive techniques, 1999, pp. 187-194.

(Continued)

*Primary Examiner* — Maria E Vazquez Colon
(74) *Attorney, Agent, or Firm* — Finnegan, Henderson, Farabow, Garrett & Dunner, LLP

(57)                    ABSTRACT

A method of decoding a bitstream to get one or more pictures for a video stream includes: receiving a bitstream; and decoding the bitstream to get the one or more pictures. The decoding includes: decoding a picture unit comprising one or more supplemental enhancement information (SEI) messages; and generating the one or more pictures based on a key picture and the one or more SEI messages, respectively.

18 Claims, 25 Drawing Sheets

(56) References Cited

OTHER PUBLICATIONS

Chen et al., "Algorithm Description of Joint Exploration Test Model 7 (JEM 7)," JVET-G1001-v1, 7th Meeting: Torino, IT, Jul. 13-21, 2017, 50 pages.

Chen et al., "Beyond key-point coding: Temporal evolution inference with compact feature representation for talking face video compression," in Proceedings of the IEEE Data Compression Conference, 10 pages, 2022.

Chen et al., "AHG9: Generative Face Video SEI Message," JVET-AC0088, 29th Meeting, by teleconference, Jan. 11-20, 2023, 2013, 6 pages.

Feng et al., "A generative compression framework for low bandwidth video conference," in ICME Workshop, 6 pages, 2021.

Goodfellow et al., "Generative adversarial nets," Advances in neural information processing systems, vol. 27, 9 pages, 2014.

International Telecommunications Union "Series H: Audiovisual and Multimedia Systems Infrastructure of audiovisual services—Coding of moving video", ITU-T Telecommunication Standardization Sector of ITU, Apr. 2013, 317 pages.

International Telecommunications Union "Series H: Audiovisual and Multimedia Systems Infrastructure of audiovisual services—Coding of moving video", ITU-T Telecommunication Standardization Sector of ITU, May 2022, 110 pages.

Jem, https://jvet.hhi.fraunhofer.de/svn/svn_HMJEMSoftware.

Lopez et al., "Head pose computation for very low bitrate video coding," in International Conference on Computer Analysis of Images and Patterns. Springer, 1995, pp. 440-447.

"Requirements for a Future Video Coding Standard v5," International Organisation for Standardisation, Torino, IT, 14 pages (2017).

Siarohin et al., "First Order Motion Model for Image Animation," Advances in Neural Information Processing Systems, vol. 32, pp. 7137-7147, 2019.

Sullivan et al., "Overview of the High Efficiency Video Coding (HEVC) Standard," IEE Transactions on Circuits and Systems for Video Technology, vol. 22, No. 12, pp. 1649-1668 (2012).

Wang et al., "One-shot free-view neural talking-head synthesis for video conferencing," in Proceedings of the IEEE/CVFConference on Computer Vision and Pattern Recognition, 2021, pp. 10039-10049.

Wang et al., "AHG9: Decoded GDR clean area hash SEI message," JVET-V0069, 22nd Meeting, by teleconference, Apr. 20-28, 2021, 6 pages.

PCT International Search Report and Written Opinion mailed Jul. 11, 2024, issued in corresponding International Application No. PCT/CN2024/087568 (6 pgs.).

* cited by examiner

FIG. 5

Table 1 Syntax of NAL unit 700

| nal_unit( NumBytesInNalUnit ) { | Descriptor |
|---|---|
| nal_unit_header( ) | |
| NumBytesInRbsp = 0 | |
| for( i = 2; i < NumBytesInNalUnit; i++ ) | |
| if( i + 2 < NumBytesInNalUnit && next_bits( 24 ) == 0x000003 ) { | |
| rbsp_byte[ NumBytesInRbsp++ ] | b(8) |
| rbsp_byte[ NumBytesInRbsp++ ] | b(8) |
| i += 2 | |
| emulation_prevention_three_byte /* equal to 0x03 */ | f(8) |
| } else | |
| rbsp_byte[ NumBytesInRbsp++ ] | b(8) |
| } | |

FIG. 7

Table 2 Syntax structure of rbsp_trailing_bits() 800

| rbsp_trailing_bits( ) { | Descriptor |
|---|---|
| rbsp_stop_one_bit /* equal to 1 */ | f(1) |
| while( !byte_aligned( ) ) | |
| rbsp_alignment_zero_bit /* equal to 0 */ | f(1) |
| } | |

FIG. 8

Table 3 NAL unit type codes and NAL unit type classes 900

| nal_unit_type | Name of nal_unit_type | Content of NAL unit and RBSP syntax structure | NAL unit type class |
|---|---|---|---|
| 0 | TRAIL_NUT | Coded slice of a trailing picture or subpicture*<br>slice_layer_rbsp( ) | VCL |
| 1 | STSA_NUT | Coded slice of an STSA picture or subpicture*<br>slice_layer_rbsp( ) | VCL |
| 2 | RADL_NUT | Coded slice of a RADL picture or subpicture*<br>slice_layer_rbsp( ) | VCL |
| 3 | RASL_NUT | Coded slice of a RASL picture or subpicture*<br>slice_layer_rbsp( ) | VCL |
| 4..6 | RSV_VCL_4..<br>RSV_VCL_6 | Reserved non-IRAP VCL NAL unit types | VCL |
| 7<br>8 | IDR_W_RADL<br>IDR_N_LP | Coded slice of an IDR picture or subpicture*<br>slice_layer_rbsp( ) | VCL |
| 9 | CRA_NUT | Coded slice of a CRA picture or subpicture*<br>slice_layer_rbsp( ) | VCL |
| 10 | GDR_NUT | Coded slice of a GDR picture or subpicture*<br>slice_layer_rbsp( ) | VCL |
| 11 | RSV_IRAP_11 | Reserved IRAP VCL NAL unit type | VCL |
| 12 | OPI_NUT | Operating point information<br>operating_point_information_rbsp( ) | non-VCL |
| 13 | DCI_NUT | Decoding capability information<br>decoding_capability_information_rbsp( ) | non-VCL |
| 14 | VPS_NUT | Video parameter set<br>video_parameter_set_rbsp( ) | non-VCL |
| 15 | SPS_NUT | Sequence parameter set<br>seq_parameter_set_rbsp( ) | non-VCL |
| 16 | PPS_NUT | Picture parameter set<br>pic_parameter_set_rbsp( ) | non-VCL |
| 17<br>18 | PREFIX_APS_NUT<br>SUFFIX_APS_NUT | Adaptation parameter set<br>adaptation_parameter_set_rbsp( ) | non-VCL |

FIG. 9

| 19 | PH_NUT | Picture header<br>picture_header_rbsp( ) | non-VCL |
|---|---|---|---|
| 20 | AUD_NUT | AU delimiter<br>access_unit_delimiter_rbsp( ) | non-VCL |
| 21 | EOS_NUT | End of sequence<br>end_of_seq_rbsp( ) | non-VCL |
| 22 | EOB_NUT | End of bitstream<br>end_of_bitstream_rbsp( ) | non-VCL |
| 23<br>24 | PREFIX_SEI_NUT<br>SUFFIX_SEI_NUT | Supplemental enhancement information<br>sei_rbsp( ) | non-VCL |
| 25 | FD_NUT | Filler data<br>filler_data_rbsp( ) | non-VCL |
| 26<br>27 | RSV_NVCL_26<br>RSV_NVCL_27 | Reserved non-VCL NAL unit types | non-VCL |
| 28..31 | UNSPEC_28..<br>UNSPEC_31 | Unspecified non-VCL NAL unit types | non-VCL |
| * indicates a property of a picture when pps_mixed_nalu_types_in_pic_flag is equal to 0 and a property of the subpicture when pps_mixed_nalu_types_in_pic_flag is equal to 1. | | | |

FIG. 9 (continued)

Table 4 syntax of NAL unit header 1000

| nal_unit_header( ) { | Descriptor |
|---|---|
| forbidden_zero_bit | f(1) |
| nuh_reserved_zero_bit | u(1) |
| nuh_layer_id | u(6) |
| nal_unit_type | u(5) |
| nuh_temporal_id_plus1 | u(3) |
| } | |

SEI ID —1510

The number of sets of feature paramters —1520 for each set, signal feature parameter —1530

Is the last set ? —1540

No

Yes

Finish

1600

1602

A picture unit is decoded. The picture unit includes one or more supplemental enhancement information (SEI) messages

1604

One or more frames are generated based on a key frame and the one or more SEI messages, respectively

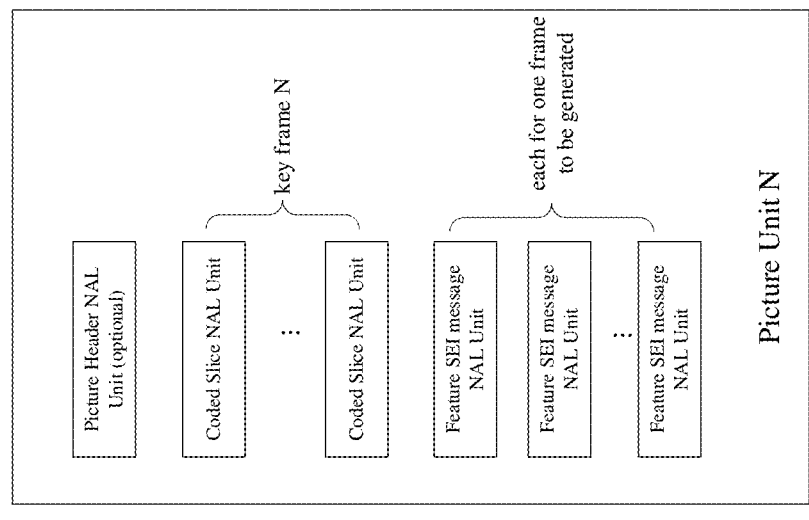
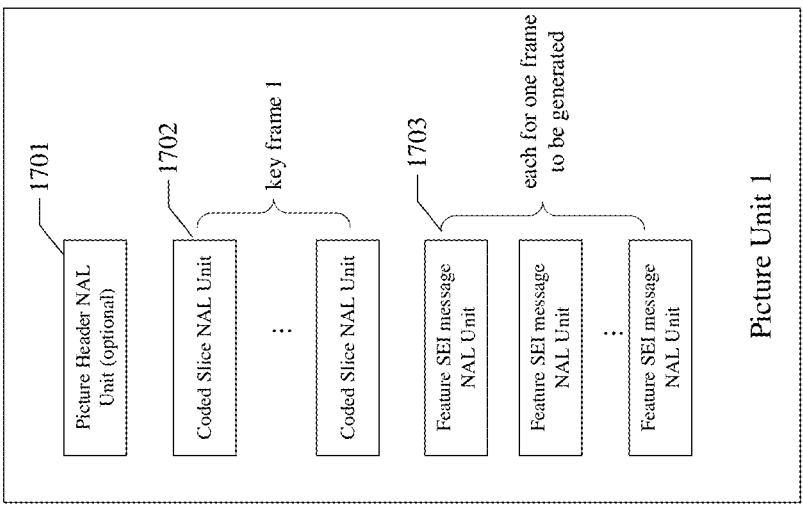
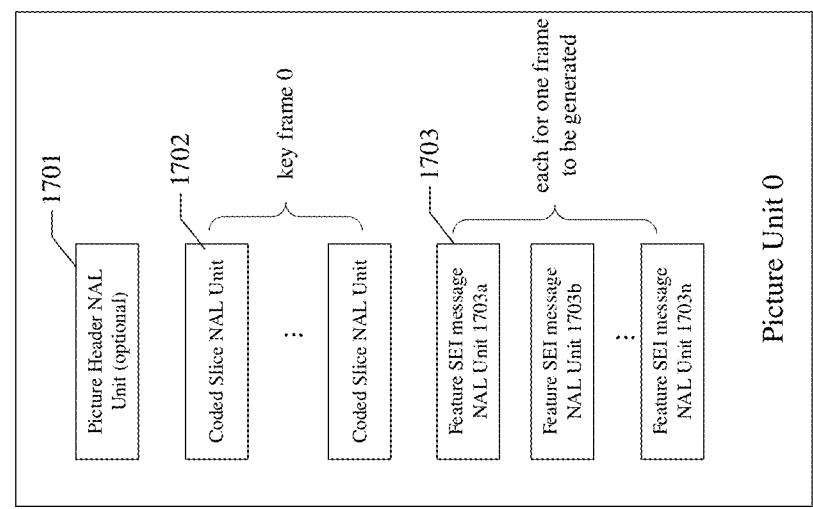
FIG. 17

Table 5 Feature SEI message syntax 1800

| face_feature ( payloadSize ) { | Descriptor |
|---|---|
| … | |
| pic_order_cnt | u(32) or ue(v) |
| … | |
| } | |

FIG. 18

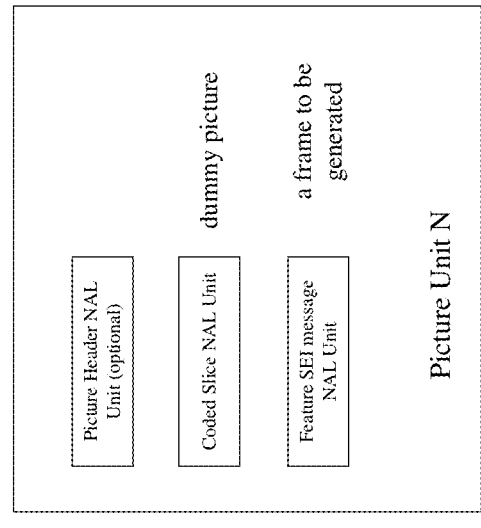
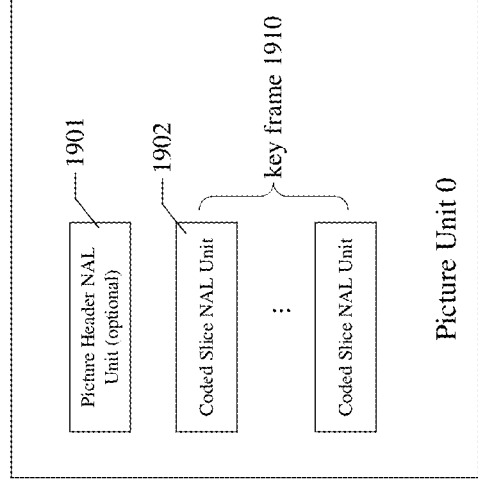
FIG. 19

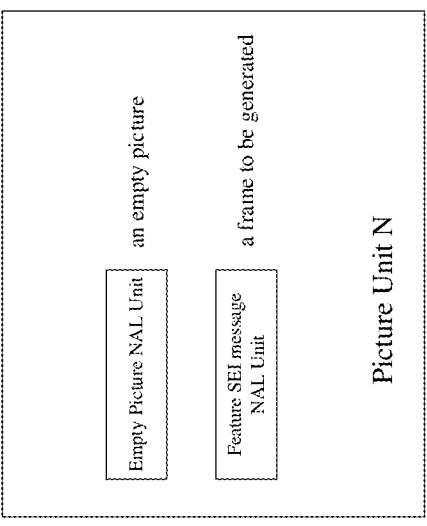
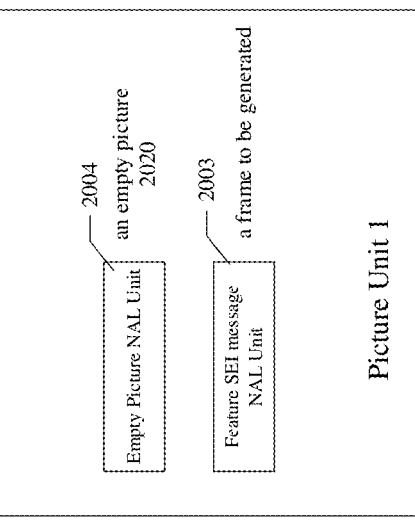
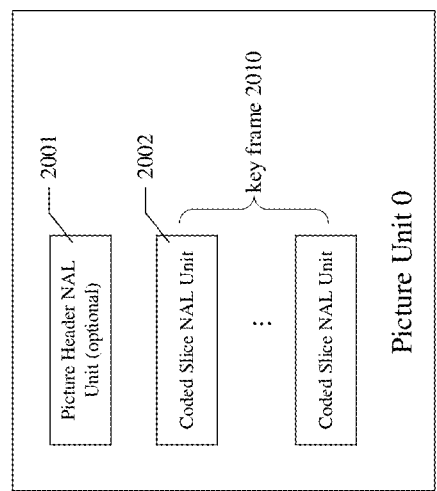
FIG. 20

2100
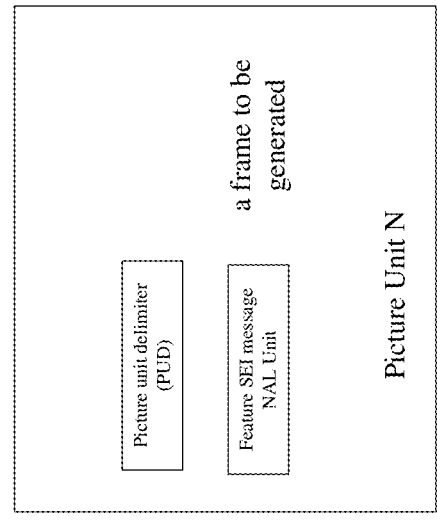
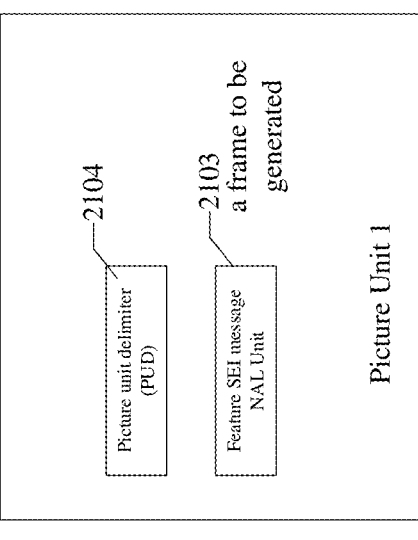
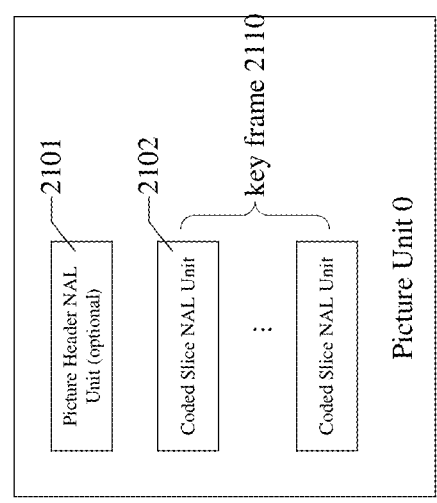
FIG. 21

Table 6 Syntax of PUD RBSP 2200

| picture_unit_delimiter_rbsp( ) { | Descriptor |
|---|---|
| pud_irap_or_gdr_flag | |
| pud_pic_type | u(3) |
| rbsp_trailing_bits( ) | |
| } | |

FIG. 22

Table 7 Interpretation of pud_pic_type 2300

| pud_pic_type | sh_slice_type values that could be present in the picture unit |
|---|---|
| 0 | I |
| 1 | P, I |
| 2 | B, P, I |

FIG. 23

Table 8 feature SEI message syntax 2400

| face_feature ( payloadSize ) { | Descriptor |
|---|---|
| key | u(32) |
| ... | |
| } | |

METHOD AND NON-TRANSITORY COMPUTER READABLE STORAGE MEDIUM FOR VIDEO GENERATIVE COMPRESSION

CROSS-REFERENCE TO RELATED APPLICATIONS

The disclosure claims the benefits of priority to U.S. Provisional Application No. 63/496,049, filed Apr. 14, 2023, and U.S. Provisional Application No. 63/511,897, filed Jul. 15, 2023, both of which are incorporated herein by reference in their entireties.

TECHNICAL FIELD

The present disclosure generally relates to video processing, and more particularly, to methods and non-transitory computer readable storage medium for video generative compression.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard, and AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

Embodiments of the present disclosure provide a method of decoding a bitstream to get one or more pictures for a video stream. The method includes: receiving a bitstream; and decoding the bitstream to get one or more pictures. The decoding includes: decoding a picture unit comprising one or more supplemental enhancement information (SEI) messages; and generating the one or more pictures based on a key picture and the one or more SEI messages, respectively.

Embodiments of the present disclosure provide a method of encoding a video sequence into a bitstream. The method includes: receiving a video sequence; encoding one or more pictures of the video sequence; and generating a bitstream. The encoding includes: encoding one or more supplemental enhancement information (SEI) messages corresponding to one or more pictures, respectively; and encoding the one or more SEI messages in a picture unit.

Embodiments of the present disclosure provide a non-transitory computer readable storage medium storing a bitstream of a video. The bitstream includes a picture unit comprising one or more supplemental enhancement information (SEI) messages, wherein the one or more SEI messages are used for generating one or more frames, respectively.

BRIEF DESCRIPTION OF THE DRAWINGS

Embodiments and various aspects of the present disclosure are illustrated in the following detailed description and the accompanying figures. Various features shown in the figures are not drawn to scale.

FIG. 5 illustrates an example structure of a coded video sequence (CVS), according to some embodiments of the present disclosure.

FIG. 7 illustrates a Table 1 showing an exemplary syntax structure of a network abstraction layer (NAL) unit, according to some embodiments of the present disclosure.

FIG. 8 illustrates a Table 2 showing an exemplary syntax structure of rbsp_trailing_bits( ), according to some embodiments of the present disclosure.

FIG. 9 illustrates a Table 3 showing an exemplary association of a raw byte sequence payload (RBSP) syntax structures to the NAL units, according to some embodiments of the present disclosure.

FIG. 10 illustrates a Table 4 showing an exemplary syntax structure of NAL unit header, according to some embodiments of the present disclosure.

FIG. 17 illustrates a first set of exemplary picture unit structures, according to some embodiments of the present disclosure.

FIG. 18 illustrates a Table 5 showing an exemplary feature SEI message syntax, according to some embodiments of the present disclosure.

FIG. 19 illustrates a second set of exemplary picture unit structures, according to some embodiments of the present disclosure.

FIG. 20 illustrates a third set of exemplary picture unit structures, according to some embodiments of the present disclosure.

FIG. 21 illustrates a fourth set of exemplary picture unit structures, according to some embodiments of the present disclosure.

FIG. 22 illustrates a Table 6 showing an exemplary syntax of PUD RBSP, according to some embodiments of the present disclosure.

FIG. 23 illustrates a Table 7 showing an exemplary interpretation of pud_pic_type, according to some embodiments of the present disclosure.

FIG. 24 illustrates a Table 8 showing an exemplary feature SEI message syntax, according to some embodiments of the present disclosure.

DETAILED DESCRIPTION

Figure 1:
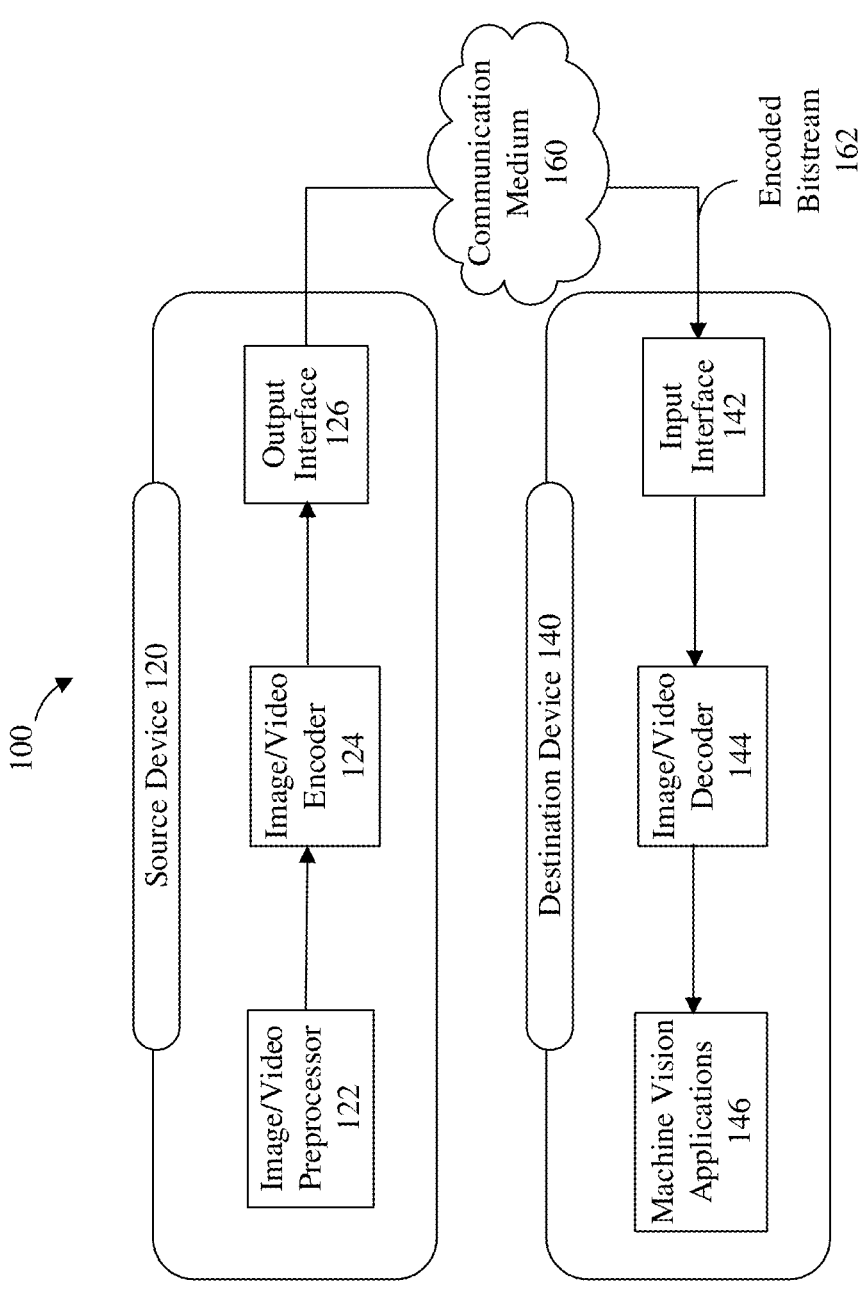
FIG. 1 is a schematic diagram illustrating an exemplary system for coding image data, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

The Joint Video Experts Team (JVET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

To achieve the same subjective quality as HEVC/H.265 using half the bandwidth, the JVET has been developing technologies beyond HEVC using the joint exploration model (JEM) reference software. As coding technologies were incorporated into the JEM, the JEM achieved substantially higher coding performance than HEVC.

The VVC standard has been developed recently and continues to include more coding technologies that provide better compression performance. VVC is based on the same hybrid video coding system that has been used in modern video compression standards such as HEVC, H.264/AVC, MPEG2, H.263, etc.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") includes changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture is referred to as a "P-picture" if some or all blocks (e.g., blocks that generally refer to portions of the video picture) in the picture are predicted using intra prediction or inter prediction with one reference picture (e.g., uni-prediction). A picture is referred to as a "B-picture" if at least one block in it is predicted with two reference pictures (e.g., bi-prediction).

FIG. 1 is a block diagram illustrating a system 100 for coding image data, according to some disclosed embodiments. The image data may include an image (also called a "picture" or "frame"), multiple images, or a video. An image is a static picture. Multiple images may be related or unrelated, either spatially or temporary. A video is a set of images arranged in a temporal sequence.

As shown in FIG. 1, system 100 includes a source device 120 that provides encoded video data to be decoded at a later time by a destination device 140. Consistent with the disclosed embodiments, each of source device 120 and destination device 140 may include any of a wide range of devices, including a desktop computer, a notebook (e.g., laptop) computer, a server, a tablet computer, a set-top box, a mobile phone, a vehicle, a camera, an image sensor, a robot, a television, a camera, a wearable device (e.g., a smart watch or a wearable camera), a display device, a digital media player, a video gaming console, a video streaming device, or the like. Source device 120 and destination device 140 may be equipped for wireless or wired communication.

Referring to FIG. 1, source device 120 may include an image/video preprocessor 122, an image/video encoder 124, and an output interface 126. Destination device 140 may include an input interface 142, an image/video decoder 144, and machine vision applications 146. Image/video encoder 124 encodes the input bitstream and outputs an encoded bitstream 162 via output interface 126. Encoded bitstream 162 is transmitted through a communication medium 160, and received by input interface 142. Image/video decoder 144 then decodes encoded bitstream 162 to generate decoded data.

More specifically, source device 120 may further include various devices (not shown) for providing source image data to be processed by Image/video encoder 124. The devices for providing the source image data may include an image/video capture device, such as a camera, an image/video archive or storage device containing previously captured images/videos, or an image/video feed interface to receive images/videos from an image/video content provider.

Image/video encoder 124 and image/video decoder 144 each may be implemented as any of a variety of suitable encoder or decoder circuitry, such as one or more microprocessors, digital signal processors (DSPs), application specific integrated circuits (ASICs), field programmable gate arrays (FPGAs), discrete logic, software, hardware, firmware, or any combinations thereof. When the encoding or decoding is implemented partially in software, image/video encoder 124 or image/video decoder 144 may store instructions for the software in a suitable, non-transitory computer-readable medium and execute the instructions in hardware using one or more processors to perform the techniques consistent this disclosure. Each of image/video encoder 124 or image/video decoder 144 may be included in one or more encoders or decoders, either of which may be integrated as part of a combined encoder/decoder (CODEC) in a respective device.

Image/video encoder 124 and image/video decoder 144 may operate according to any video coding standard, such as Advanced Video Coding (AVC), High Efficiency Video Coding (HEVC), Versatile Video Coding (VVC), AOMedia Video 1 (AV1), Joint Photographic Experts Group (JPEG), Moving Picture Experts Group (MPEG), etc. Alternatively, image/video encoder 124 and image/video decoder 144 may be customized devices that do not comply with the existing standards. Although not shown in FIG. 1, in some embodiments, image/video encoder 124 and image/video decoder 144 may each be integrated with an audio encoder and decoder, and may include appropriate MUX-DEMUX units, or other hardware and software, to handle encoding of both audio and video in a common data stream or separate data streams.

Output interface 126 may include any type of medium or device capable of transmitting encoded bitstream 162 from source device 120 to destination device 140. For example, output interface 126 may include a transmitter or a transceiver configured to transmit encoded bitstream 162 from source device 120 directly to destination device 140 in real-time. Encoded bitstream 162 may be modulated according to a communication standard, such as a wireless communication protocol, and transmitted to destination device 140.

Communication medium 160 may include transient media, such as a wireless broadcast or wired network transmission. For example, communication medium 160 may include a radio frequency (RF) spectrum or one or more physical transmission lines (e.g., a cable). Communication medium 160 may form part of a packet-based network, such as a local area network, a wide-area network, or a global network such as the Internet. In some embodiments, communication medium 160 may include routers, switches, base stations, or any other equipment that may be useful to facilitate communication from source device 120 to destination device 140. For example, a network server (not shown) may receive encoded bitstream 162 from source device 120 and provide encoded bitstream 162 to destination device 140, e.g., via network transmission.

Communication medium 160 may also be in the form of a storage media (e.g., non-transitory storage media), such as a hard disk, flash drive, compact disc, digital video disc, Blu-ray disc, volatile or non-volatile memory, or any other suitable digital storage media for storing encoded image data. In some embodiments, a computing device of a medium production facility, such as a disc stamping facility, may receive encoded image data from source device 120 and produce a disc containing the encoded video data.

Input interface 142 may include any type of medium or device capable of receiving information from communication medium 160. The received information includes encoded bitstream 162. For example, input interface 142 may include a receiver or a transceiver configured to receive encoded bitstream 162 in real-time.

System 100 can be configured to perform video encoding and decoding based on block-based video compression techniques, deep learning based video compression techniques, talking face video compression techniques, etc.

Video coding has multiple stages of operations, examples of which are shown in FIGS. 2A-2B and FIGS. 3A-3B. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

Figure 2A:
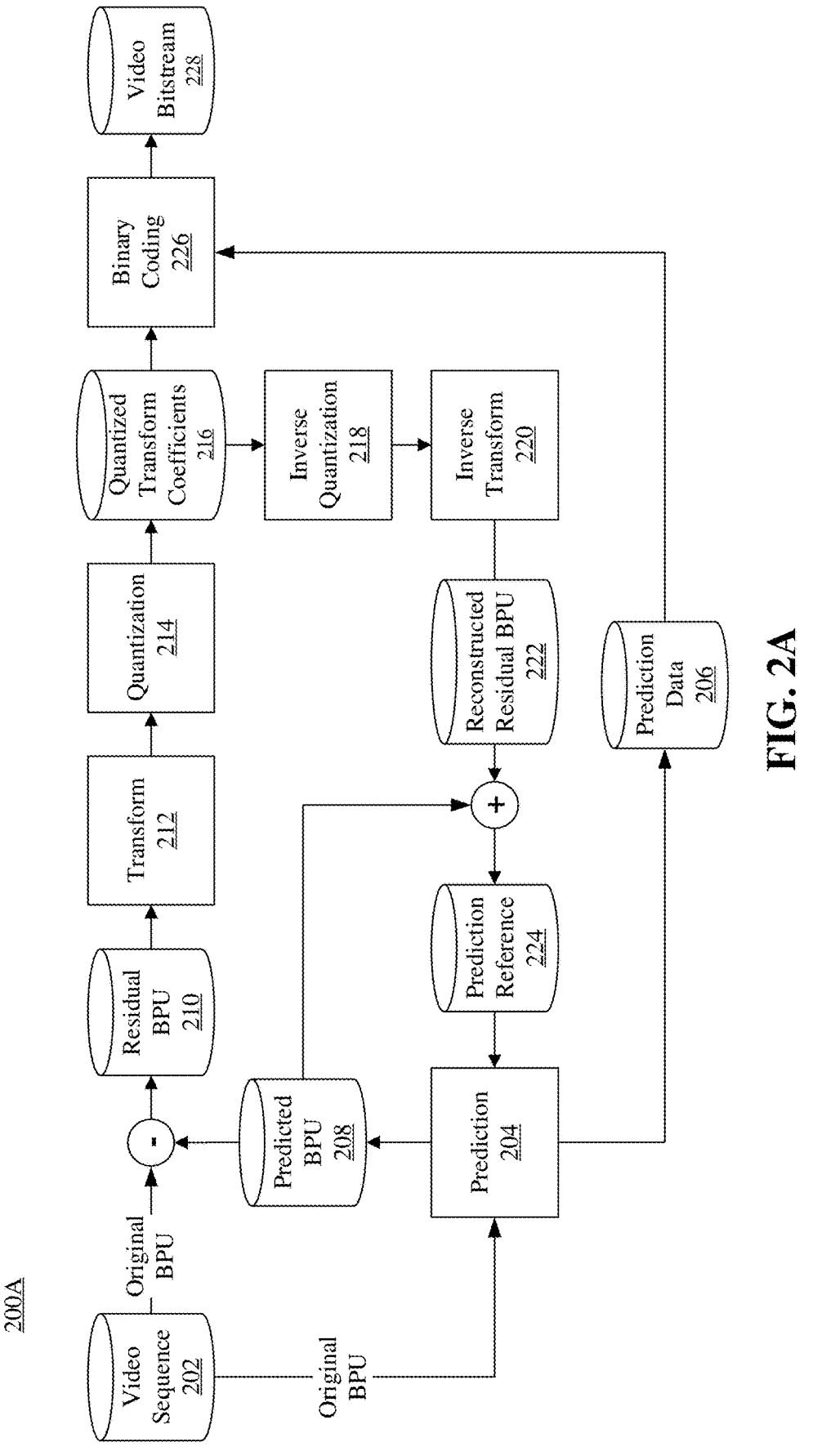
FIG. 2A is a schematic diagram illustrating an exemplary block-based encoding process, according to some embodiments of the present disclosure.
Figure 2B:
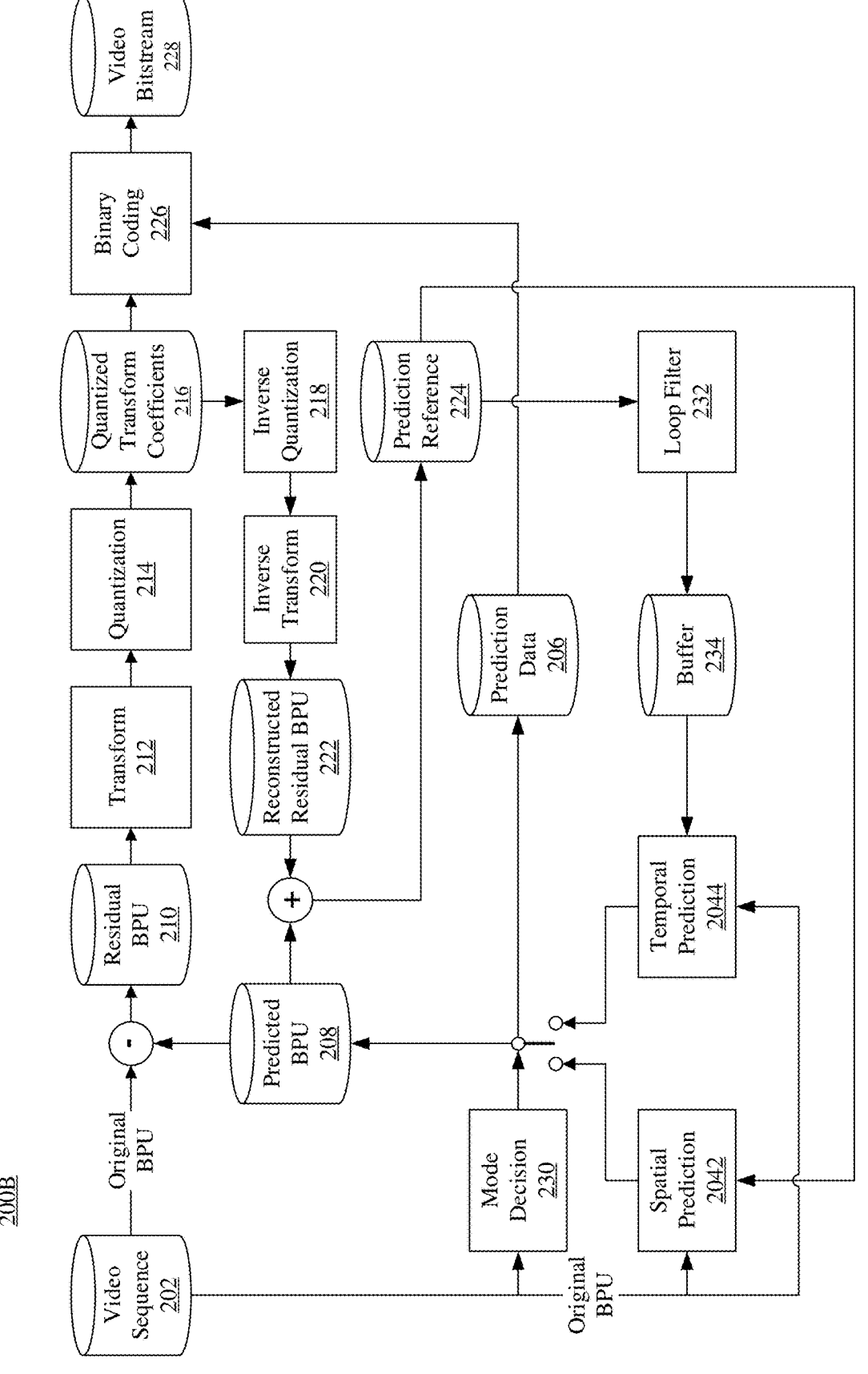
FIG. 2B is a schematic diagram illustrating another exemplary block-based encoding process, according to some embodiments of the present disclosure.

For example, at a mode decision stage (an example of which is shown in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which is shown in FIGS. 2A-2B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which is shown in FIG. 2A and FIG. 2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence can have different partition schemes for dividing a picture into regions.

FIG. 2A illustrates a schematic diagram of an exemplary encoding process 200A, consistent with embodiments of the disclosure. For example, the encoding process 200A can be performed by an encoder. As shown in FIG. 2A, the encoder can encode video sequence 202 into video bitstream 228 according to process 200A. Each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization scale factor") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization syntax element or any other syntax element of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, syntax elements of the prediction operation, a transform type at transform stage 212, syntax elements of the quantization process (e.g., quantization syntax elements), an encoder control syntax element (e.g., a bitrate control syntax element), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

FIG. 2B illustrates a schematic diagram of another exemplary encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, syntax elements of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline, it can be deemed that the matching region "moves" to the location of the original BPU as time goes by. The encoder can record the direction and distance of such a motion as a "motion vector." When multiple reference pictures are used, the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used, the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). The encoder can feed prediction reference 224 to loop filter stage 232, at which the encoder can apply a loop filter to prediction reference 224 to reduce or eliminate distortion (e.g., blocking artifacts) introduced during coding of the prediction reference 224. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer (DPB)") for later use (e.g., to be used as an inter-prediction reference picture for a future picture of video sequence 202). The encoder can store one or more reference pictures in buffer 234 to be used at temporal prediction stage 2044. In some embodiments, the encoder can encode syntax elements of the loop filter (e.g., a loop filter strength) at binary coding stage 226, along with quantized transform coefficients 216, prediction data 206, and other information.

Figure 3A:
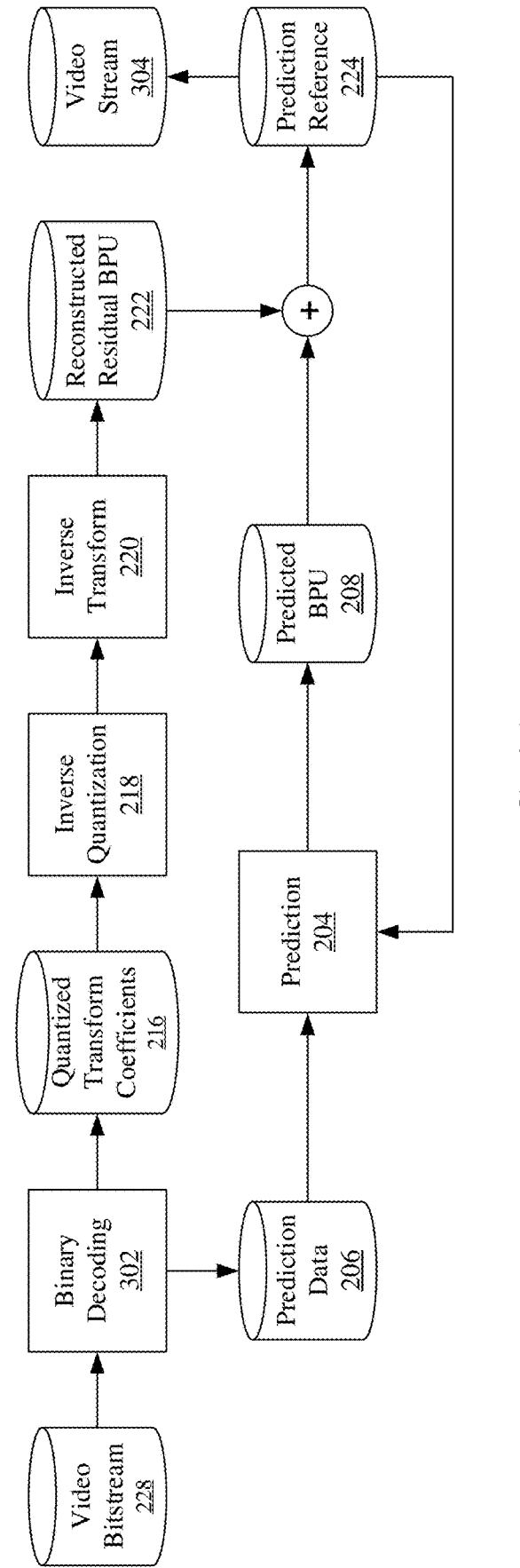
FIG. 3A is a schematic diagram illustrating an exemplary block-based decoding process, according to some embodiments of the present disclosure.

FIG. 3A illustrates a schematic diagram of an exemplary decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIG. 2A and FIG. 2B), generally, video stream 304 is not identical to video sequence 202. Similar to processes 200A and 200B in FIG. 2A and FIG. 2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, syntax elements of the prediction operation, a transform type, syntax elements of the quantization process (e.g., quantization syntax elements), an encoder control syntax element (e.g., a bitrate control syntax element), or the like. In some embodiments, if video bitstream 228 is transmitted over a network in packets, the decoder can depacketize video bitstream 228 before feeding it to binary decoding stage 302.

Figure 3B:
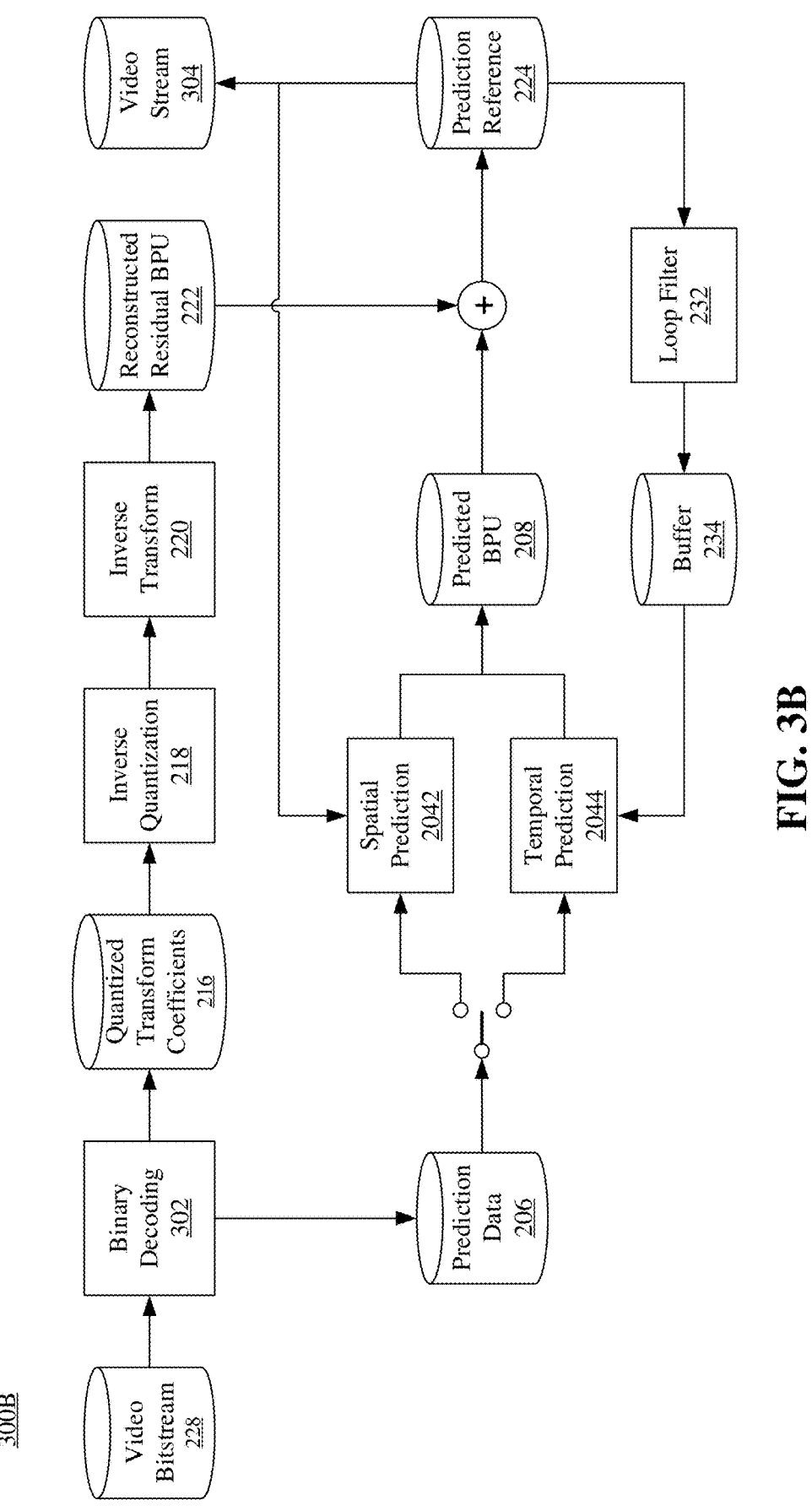
FIG. 3B is a schematic diagram illustrating another exemplary block-based decoding process, according to some embodiments of the present disclosure.

FIG. 3B illustrates a schematic diagram of another exemplary decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, syntax elements of the intra prediction operation, or the like. The syntax elements of the intra prediction operation can include, for example, locations (e.g., coordinates) of one or more neighboring BPUs used as a reference, sizes of the neighboring BPUs, syntax elements of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, syntax elements of the inter prediction operation, or the like. The syntax elements of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the decoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer (DPB) in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, prediction data can further include syntax elements of the loop filter (e.g., a loop filter strength). In some embodiments, prediction data includes syntax elements of the loop filter when the prediction mode indicator of prediction data 206 indicates that inter prediction was used to encode the current BPU.

Figure 4:
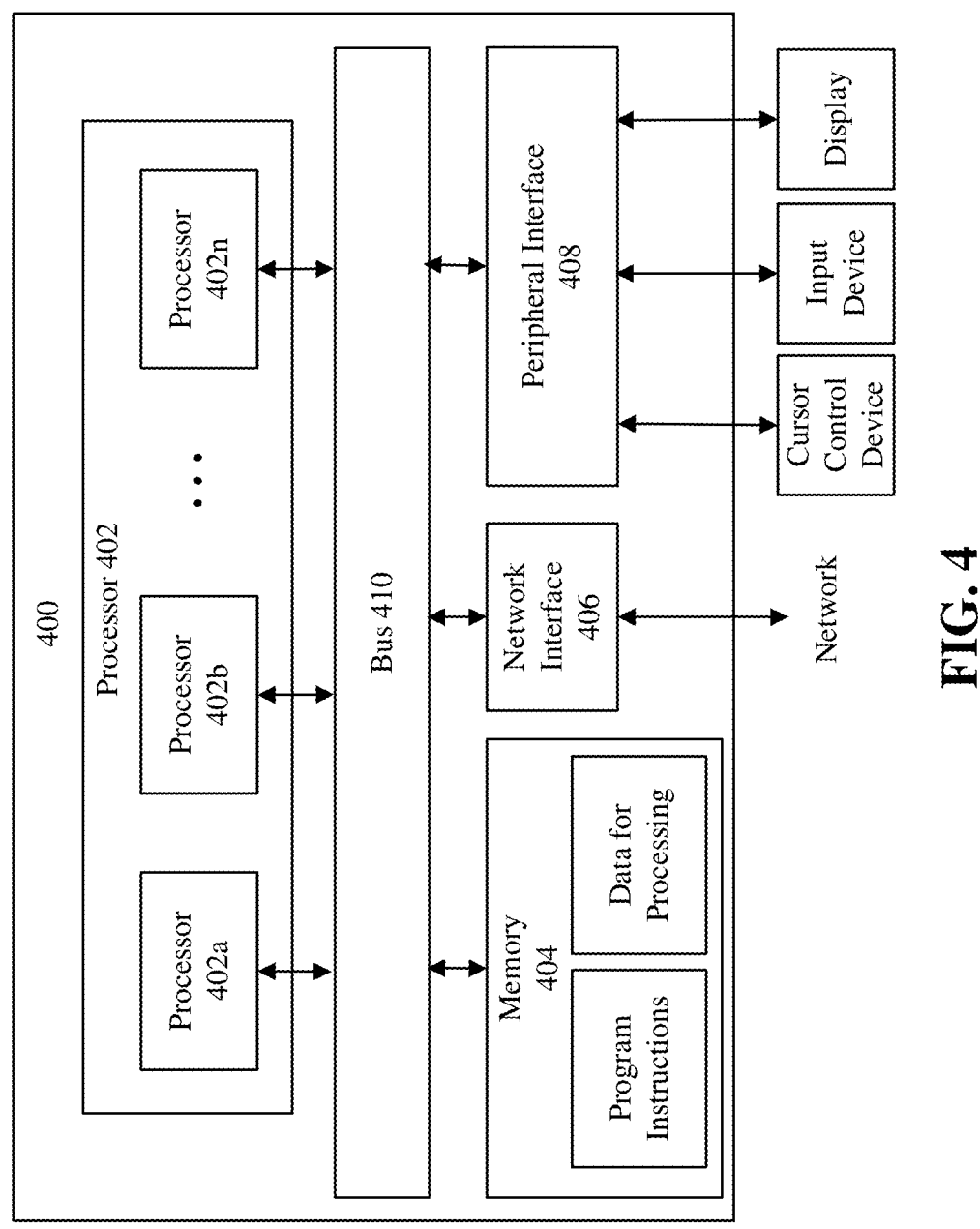
FIG. 4 is a block diagram of an exemplary apparatus for encoding or decoding a video, consistent with embodiments of the disclosure.

FIG. 4 is a block diagram of an exemplary apparatus 400 for encoding or decoding a video, consistent with embodiments of the disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, a near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

The present disclosure provides methods for signaling supplemental enhancement information (SEI) messages used for video generative compression.

Figure 5:
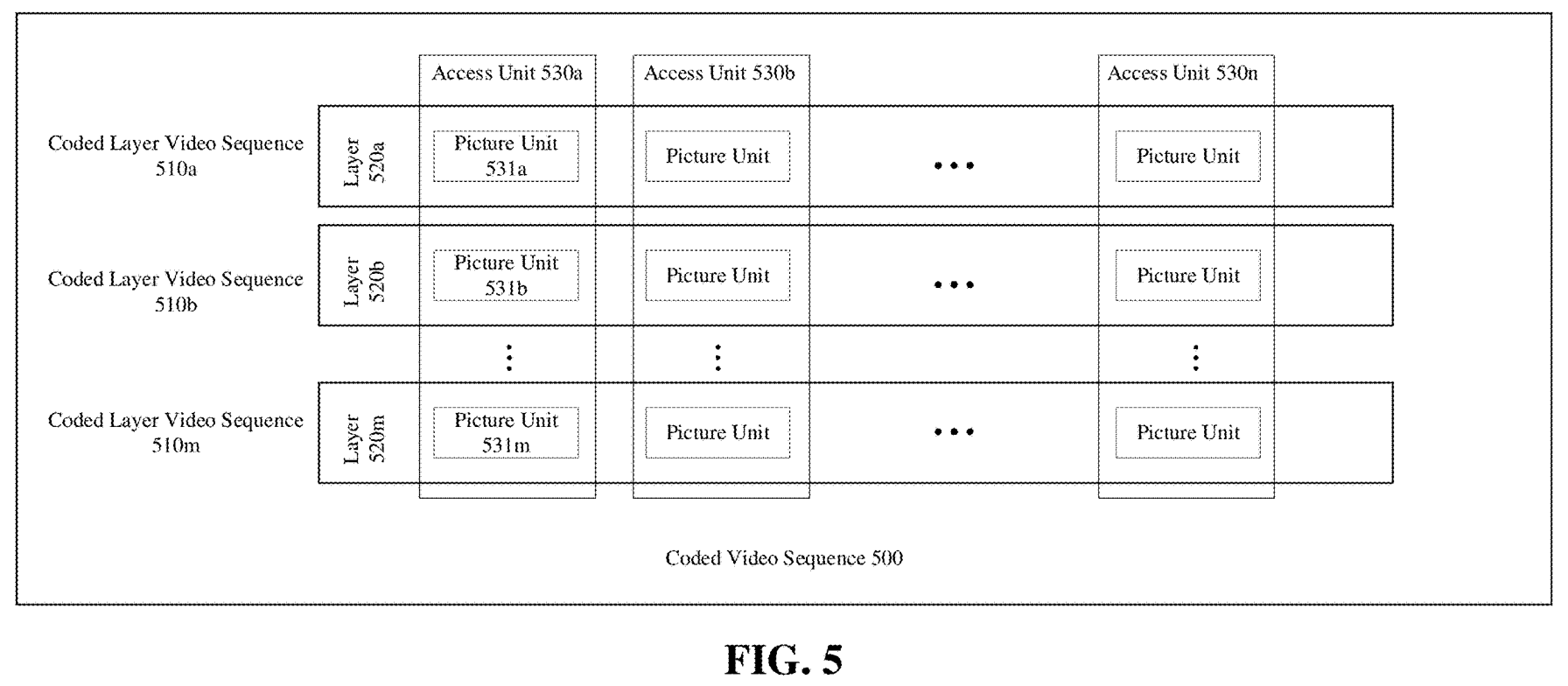
Figure 6:
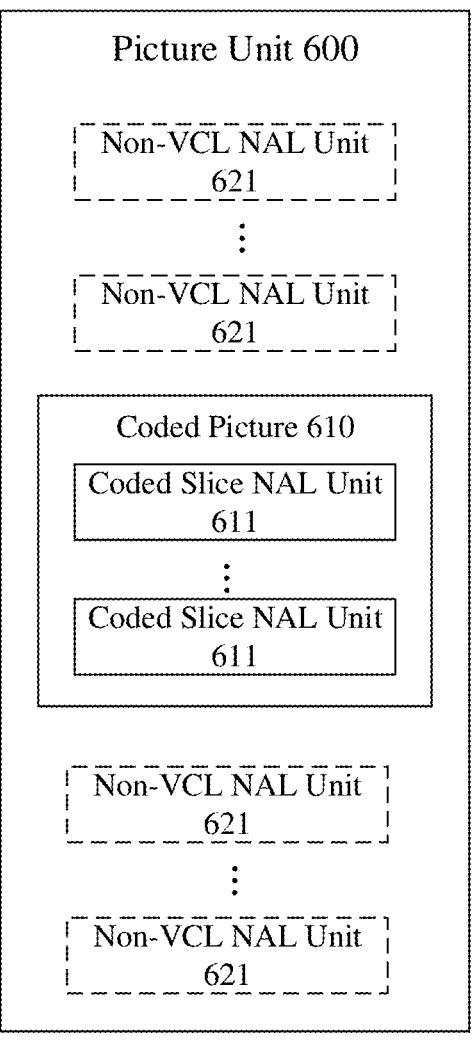
FIG. 6 illustrates a structure of an exemplary picture unit (PU), according to some embodiments of the present disclosure.

First, an exemplary bitstream structure used in the art is described. As in AVC and HEVC, a bitstream in VVC includes one or more coded video sequences (CVSs). A CVS is independently coded from other CVSs. FIG. 5 illustrates an example structure of a CVS 500, according to some embodiments of the present disclosure. Each CVS 500 includes one or more layers (e.g., 520a, 520b, . . . 520m), and each layer is a representation of the video with a specific quality or spatial resolution, or a representation of some component interpretation property, e.g., as depth or transparency maps or perspective views. In another dimension, each CVS consists of one or more access units (AUS) (e.g., 530a, 530b, . . . 530n), and each AU consists of one or more picture units (PUs) of different layers. For example, an AU 530a includes PUs 531a, 531b, . . . 531m, which correspond to layers 520a, 520b, . . . 520m, respectively. A coded layer video sequence (CLVS) (e.g., 510a, 510b . . . 510n) is a layer-wise CVS that consists of a sequence of PUs in the same layer. If a bitstream has multiple layers, a CVS in a bitstream has multiple CLVSs (e.g., 510a, 510b . . . 510n). Otherwise, a CVS is identical to a CLVS. As shown in FIG. 5, an AU (e.g., 530a, 530b, or 530n) is represented by a vertical group of PUs belonging to the same time instant, while a CLVS 510 is represented by a horizontal group of PUs belonging to the same layer that spans across several AUs (e.g., 530a, 530b, . . . 530n). FIG. 6 illustrates a structure of an exemplary picture unit (PU) 600, according to some embodiments of the present disclosure. A simplified structure of PU 600 is presented in FIG. 6. PU 600 contains one coded picture 610, and each coded picture 610 comprises one or more coded slice network abstraction layer (NAL) units 611, which are also referred to as VCL NAL units. In addition to coded slice NAL units 611, PU 600 may contain non-VCL NAL units 621, such as parameter sets and SEI NAL units. NAL units (including VCL NAL units 611 and non-VCL NAL units 621) are typically ordered in PU 600 as follows (some NAL units are optional): decoding capability information (DCI), video parameter set (VPS), sequence parameter set (SPS), picture parameter set (PPS), prefix adaptation parameter set (APS), picture header (PU), prefix supplemental enhancement information (SEI), VCL, suffix SEI, suffix APS and end of sequence (EOS), Additionally, an access unit delimiter (AUD) NAL unit and operating point information (OPI) NAL unit are allowed only at the start of an AU and an end of bitstream (EOB) NAL unit is allowed only at the end of an AU.

A VVC NAL unit includes a two-byte NAL unit header and a NAL unit payload, as in HEVC. However, the syntax of the NAL unit header is slightly different compared to HEVC. The NAL unit header in both HEVC and VVC includes a layer identifier (ID), a NAL unit type, and a temporal ID, which are important for both the decoding process and systems usage. For instance, some systems may utilize the information carried in the NAL unit header to perform actions such as accessing a bitstream from a specific point onwards or stream adaptation through (temporal) layer pruning during network transmission.

A NAL unit includes a NAL unit header and payload. FIG. 7 illustrates a Table 1 showing an exemplary syntax structure 700 of NAL unit, according to some embodiments of the present disclosure. FIG. 8 illustrates a Table 2 showing an exemplary syntax structure 800 of rbsp_trailing_bits( ), according to some embodiments of the present disclosure.

The semantics relevant to syntax structures 700 and 800 are described below.

NumBytesInNalUnit specifies the size of the NAL unit in bytes. This value is used for decoding of the NAL unit. Some form of demarcation of NAL unit boundaries is used to enable inference of NumBytesInNalUnit.

The video coding layer (VCL) is specified to efficiently represent the content of the video data. The NAL is specified to format that data and provide header information in a manner appropriate for conveyance on a variety of communication channels or storage media. All data are contained in NAL units, each of which contains an integer number of bytes. A NAL unit specifies a generic format for use in both packet-oriented and bitstream systems. The format of NAL units for both packet-oriented transport and byte stream is identical except that each NAL unit can be preceded by a start code prefix and extra padding bytes in the byte stream format.

rbsp_byte[i] is the i-th byte of a raw byte sequence payload (RBSP). An RBSP is specified as an ordered sequence of bytes as follows.

The RBSP contains a string of data bits (SODB) as follows:

If the SODB is empty (i.e., zero bits in length), the RBSP is also empty.

Otherwise, the RBSP contains the SODB as follows:

1) The first byte of the RBSP contains the first (most significant, left-most) eight bits of the SODB; the next byte of the RBSP contains the next eight bits of the SODB, etc., until fewer than eight bits of the SODB remain.

2) The rbsp_trailing_bits( ), syntax structure is present after the SODB as follows:

i) The first (most significant, left-most) bits of the final RBSP byte contain the remaining bits of the SODB (if any).

ii) The next bit consists of a single bit equal to 1 (i.e., rbsp_stop_one_bit).

iii) When the rbsp_stop_one_bit is not the last bit of a byte-aligned byte, one or more zero-valued bits (i.e., instances of rbsp_alignment_zero_bit) are present to result in byte alignment.

3) One or more rbsp_cabac_zero_word 16-bit syntax elements equal to 0x0000 could be present in some RBSPs after the rbsp_trailing_bits( ), at the end of the RBSP.

Syntax structures having these RBSP properties are denoted in the syntax tables using an "_rbsp" suffix. These structures are carried within NAL units as the content of the rbsp_byte[i] data bytes. FIG. 9 illustrates a Table 3 showing an exemplary association of the RBSP syntax structures to the NAL units, according to some embodiments of the present disclosure.

When the boundaries of the RBSP are known, the decoder could extract the SODB from the RBSP by concatenating the bits of the bytes of the RBSP and discarding the rbsp_stop_one_bit, which is the last (least significant, right-most) bit equal to 1, and discarding any following (less significant, farther to the right) bits that follow it, which are equal to 0. The data necessary for the decoding process is contained in the SODB part of the RBSP.

emulation_prevention_three_byte is a byte equal to 0x03. When an emulation_prevention_three_byte is present in the NAL unit, it is discarded by the decoding process.

The last byte of the NAL unit is not equal to 0x00.

Within the NAL unit, the following three-byte sequences do not occur at any byte-aligned position:

0x000000;
0x000001;
0x000002.

Within the NAL unit, any four-byte sequence that starts with 0x000003 other than the following sequences does not occur at any byte-aligned position:

0x00000300;
0x00000301;
0x00000302;
0x00000303.

FIG. 10 illustrates a Table 4 showing an exemplary syntax structure of NAL unit header 1000, according to some embodiments of the present disclosure. The relevant semantics are described as follows.

forbidden_zero_bit is equal to 0.

nuh_reserved_zero_bit is equal to 0. The value 1 of nuh_reserved_zero_bit could be specified in the future by ITU-T|ISO/IEC. Although the value of nuh_reserved_zero_bit is required to be equal to 0 in VVC Specification, decoders conforming to VVC Specification allow the value of nuh_reserved_zero_bit equal to 1 to appear in the syntax and ignore (i.e., remove from the bitstream and discard) NAL units with nuh_reserved_zero_bit equal to 1.

nuh_layer_id specifies the identifier of the layer to which a VCL NAL unit belongs or the identifier of a layer to which a non-VCL NAL unit applies. The value of nuh_layer_id is in the range of 0 to 55, inclusive. Other values for nuh_layer_id are reserved for future use by ITU-T|ISO/IEC. Although the value of nuh_layer_id is required to be the range of 0 to 55, inclusive, in VVC Specification, decoders conforming to VVC Specification allow the value of nuh_layer_id to be greater than 55 to appear in the syntax and ignore (i.e., remove from the bitstream and discard) NAL units with nuh_layer_id greater than 55.

The value of nuh_layer_id is the same for all VCL NAL units of a coded picture. The value of nuh_layer_id of a coded picture or a PU is the value of the nuh_layer_id of the VCL NAL units of the coded picture or the PU.

When nal_unit_type is equal to PH_NUT, or FD_NUT, nuh_layer_id is equal to the nuh_layer_id of associated VCL NAL unit.

When nal_unit_type is equal to EOS_NUT, nuh_layer_id is equal to one of the nuh_layer_id values of the layers present in the CVS.

The value of nuh_layer_id for DCI, OPI, VPS, AUD, and EOB NAL units are not constrained.

nal_unit_type specifies the NAL unit type, i.e., the type of RBSP data structure contained in the NAL unit as specified in Table 3 shown in FIG. 9.

NAL units that have nal_unit_type in the range of UNSPEC_28 . . . UNSPEC_31, inclusive, for which semantics are not specified, do not affect the decoding process specified in VVC Specification.

NAL unit types in the range of UNSPEC_28 . . . UNSPEC_31 can be used as determined by the application. No decoding process for these values of nal_unit_type is specified in this Specification. Since different applications might use these NAL unit types for different purposes, particular care is expected to be exercised in the design of encoders that generate NAL units with these nal_unit_type values, and in the design of decoders that interpret the content of NAL units with these nal_unit_type values. VVC Specification does not define any management for these values. These nal_unit_type values might only be suitable for use in contexts in which "collisions" of usage (i.e., different definitions of the meaning of the NAL unit content for the same nal_unit_type value) are unimportant, or not possible, or are managed—e.g., defined or managed in the controlling application or transport specification, or by controlling the environment in which bitstreams are distributed.

For purposes other than determining the amount of data in the PUs of the bitstream, decoders ignore (remove from the bitstream and discard) the contents of all NAL units that use reserved values of nal_unit_type.

nuh_temporal_id_plus1 minus 1 specifies a temporal identifier for the NAL unit.

The value of nuh_temporal_id_plus1 is not equal to 0.

Next, the supplemental enhancement information (SEI) message is described. SEI messages are intended to be conveyed within coded video bitstream in a manner specified in a video coding specification or to be conveyed by other means determined by the specifications for systems that make use of such coded video bitstream. SEI messages can contain various types of data that indicate the timing of the video pictures or describe various properties of the coded video or how it can be used or enhanced. SEI messages are also defined to be able to contain arbitrary user-defined data. SEI messages do not affect the core decoding process, but can indicate how the video is recommended to be post-processed or displayed.

SEI assists in processes related to decoding, display or other purposes. Like video usability information (VUI), the SEI does not affect the signal processing operations within the decoding process. SEI syntax for various purposes is carried in syntax structures called SEI messages, and one or more SEI messages are carried within NAL units called SEI NAL units. SEI messages can have a very high level of scope like that of the VUI, or may have a narrower scope, such as applying to an individual picture or slice. As their name implies, SEI messages are intended to be supplemental to the video content. Decoder support of SEI messages is generally optional, and even if a decoder uses an SEI message, in most cases the decoder is not required to use an SEI message exactly in the way it is described in the standard. However, SEI messages do affect bitstream conformance (e.g., if the syntax of an SEI message in a bitstream does not follow the specification, then the bitstream is not conforming to the standard) and some SEI messages are used for specifying the HRD operations and HRD-based bitstream conformance requirements.

To specify SEI message, the JVET work group also developed H.274 standard, which specifies the syntax and semantics of video usability information (VUI) parameters and supplemental enhancement information (SEI) messages that is particularly intended for use with coded video bitstreams as specified by VVC standard. But since VUI parameters and SEI message don't affect the decoding process, the SEI messages in H.274 can also be used with other types of coded video bitstream, such as H.265/HEVC, H.264/AVC, etc.

Next, the face video generative compression is described. With the emergence of deep generative models including Variational Auto-Encoding (VAE) and Generative Adversarial Networks (GAN), the facial video compression has achieved promising performance improvement. In 2018, Wiles designed X2Face to control face generation via images, audio, and pose codes. Besides, Zakharov et al. presented a realistic neural talking head models via few-shot adversarial learning. For Video-to-video synthesis tasks, NVIDIA research team first proposed Face-vidtovid in 2019. Subsequently, in 2020, they proposed a novel scheme that could leverage compact 3D keypoint representation to drive a generative model for rendering the target frame. Moreover, Facebook research team designed a mobile-compatible video chat system based on FOMM. Feng et al. propose VSBNet that utilizes the adversarial learning to reconstruct origin frames from the landmarks. In addition, Chen et al. proposed an end-to-end talking-head video compression framework based upon compact feature learning (CFTE), which is elegantly designed for high efficiency talking face video compression towards ultra-low bandwidth scenarios. The CFTE scheme leverages the compact feature representation to compensate for the temporal evolution and reconstruct the target face video frame in an end-to-end manner. Moreover, it can be incorporated into the video coding framework with the supervision of rate-distortion objective.

Figure 11:
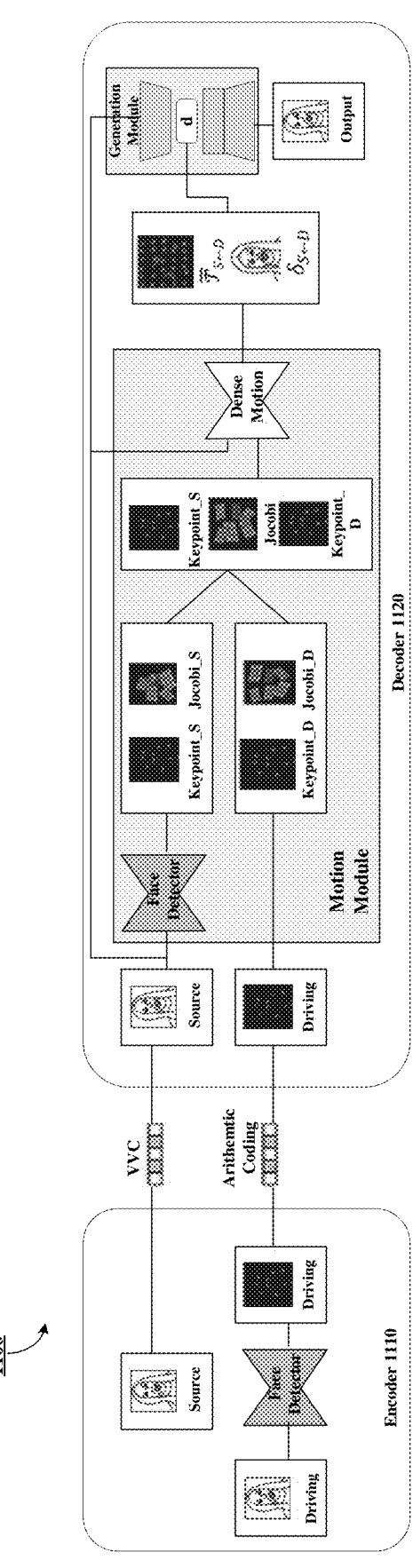
FIG. 11 is a schematic diagram illustrating an exemplary deep learning based video generative compression framework, according to some embodiments of the present disclosure.

FIG. 11 is a schematic diagram illustrating an exemplary deep learning based video generative compression framework 1100, according to some embodiments of the present disclosure. For example, framework 1100 can be based on the First Order Motion Model (FOMM). The FOMM deforms a reference source frame to follow the motion of a driving video. While this method works on various types of videos (for example, motion pictures, cartoons), this method can also be used for face animation applications. FOMM follows an encoder-decoder architecture with a motion transfer component including the following steps.

Firstly, a keypoint extractor (also referred to as a motion module) is learned using an equivariant loss, without explicit labels. By this keypoint extractor, two sets of ten learned keypoints are computed for the source and driving frames. The learned keypoints are transformed from the feature map with the size of channel×64×64 via the Gaussian map function, thus every corresponding keypoint can represent different channels feature information. It should be mentioned that every keypoint is point of (x, y) that can represent the most important information of feature map.

Secondly, a dense motion network uses the landmarks and the source frame to produce a dense motion field and an occlusion map.

Then, the encoder 1110 encodes the source frame via the traditional image/video compression method, such as HEVC/VVC or JPEG/BPG. Here, the VVC is used to compress the source frame.

In the later stage, the resulting feature map is warped using the dense motion field (using a differentiable grid-sample operation), then multiplied with the occlusion map.

Lastly, the decoder 1120 generates an image from the warped map.

Figure 12:
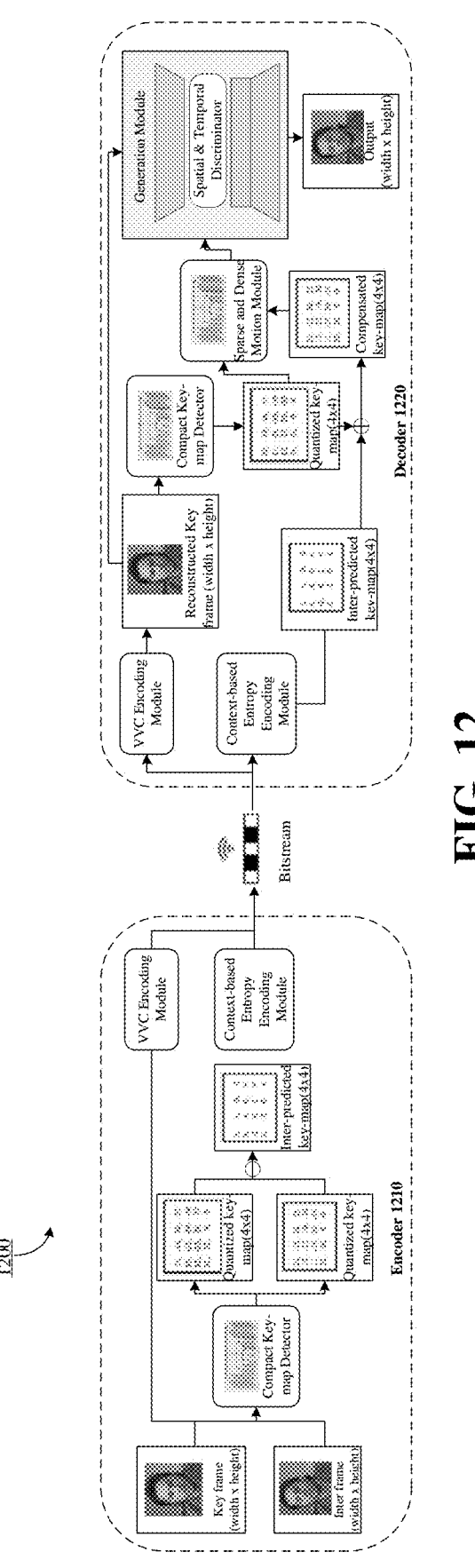
FIG. 12 illustrates an exemplary deep learning-based video generative compression framework, according to some embodiments of the present disclosure.

FIG. 12 illustrates an exemplary deep learning-based video generative compression framework 1200, according to some embodiments of the present disclosure. FIG. 12 provides another basic framework of the deep-based video generative compression scheme based on compact feature representation, namely CFTE. It follows an encoder-decoder architecture that applies a context-based coding scheme.

At the encoder 1210 side, the compression framework includes three modules: an encoder (also referred to as VVC encoding module) for compressing the key frame, a feature extractor for extracting the compact human features of the other inter frames, and a feature coding module for compressing the inter-predicted residuals of compact human features. First, the key frame that represents the human textures is compressed with the VVC encoder. Through the compact feature extractor, each of the subsequent inter frames is represented with a compact feature matrix with the size of 1×4×4. It should be mentioned that the size of compact feature matrix is not fixed, and the number of feature parameters can also be increased or decreased according to the specific requirement of bit consumption. Then, these extracted features are inter-predicted and quantized, and the residuals are finally entropy-coded as the final bitstream.

At the decoder 1220 side, this compression framework also contains three main modules, including decoding for reconstructing the key frame, the reconstruction of the compact features by entropy decoding and compensation, and the generation of the final video by leveraging the reconstructed features and decoded key frame. More specifically, during the generation of the final video, the decoded key frame from the VVC bitstream can be further represented in the form of features through compact feature extraction. Subsequently, given the features from the key and inter frames, relevant sparse motion field is calculated, facilitating the generation of the pixel-wise dense motion map and occlusion map. Finally, based on deep generative model, the decoded key frame, pixel-wise dense motion map and occlusion map with implicit motion field characterization are used to produce the final video with accurate appearance, pose, and expression.

To further pursue the coding performance, numerous studies focusing on 3D face have been conducted. A 3D head model is adopted and only the pose parameters for the task of face-specific video compression are encoded. Subsequently, both Eigenspaces and Principal Component Analysis (PCA) models have been used in this task. However, based on these traditional 3D techniques, the visual quality of the reconstructed images is unacceptable. With the development of deep generative models, this 3DMM-assisted face video generation task can provide promising results.

Figure 13:
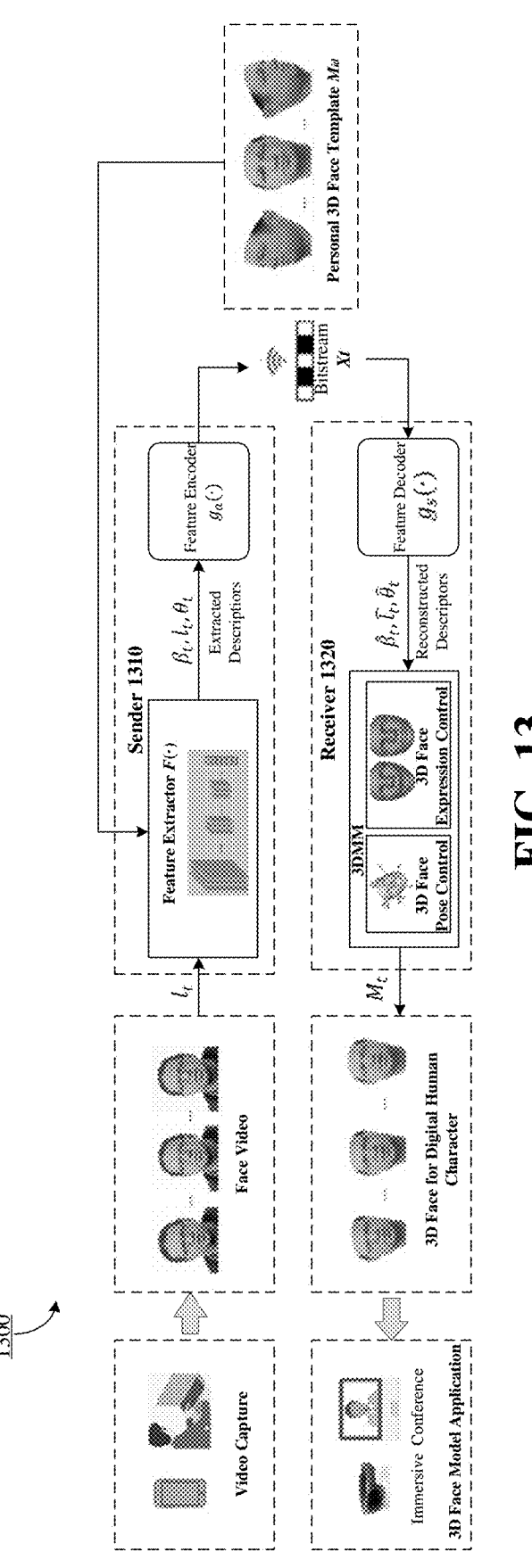
FIG. 13 is a schematic diagram illustrating a general encoder-decoder generative compression framework of 3DMM-assisted talking face video, according to some embodiments of the present disclosure.

FIG. 13 is a schematic diagram illustrating a general encoder-decoder generative compression framework 1300 of 3DMM-assisted talking face video, according to some embodiments of the present disclosure. Generally speaking, the 3DMM-assisted face video generation can provide accurate 3D face reconstruction based on the combination of shape $\bar{S}$ and texture $\bar{\mathcal{T}}$, which are given by:

$$S = \mathcal{S}(\alpha, \beta) = \bar{S} + B_{id}\alpha + B_{exp}\beta$$

$$\mathcal{T} = \mathcal{T}(\delta) = \bar{\mathcal{T}} + B_t\delta$$

where $\bar{S}$ and $\bar{\mathcal{T}}$ denote average identity and texture, and the basis vectors of the identity, expression and texture space are represented with $B_{id}$, $B_{exp}$, $B_t$. The face identity, expression and texture are represented with the $\alpha$, $\beta$ and $\delta$, which are corresponding feature vectors to control the reconstructed face. Furthermore, the pose and position of the 3D face are controlled by angle $\theta$ and translation l. As a result, at the encoder side (e.g., sender 1310), the 3DMM parameters that serve as the feature descriptors of the 3D face are compressed. Furthermore, the decoder (e.g., receiver 1320) receives the bitstream to reconstruct 3DMM template (e.g., 3D face mesh, 3D face landmark and etc.). The reconstructed 3D information from source image and driving image are used as guidance to learn the optical flow needed for the re-enacted face synthesis.

There are several problems associated with signaling the SEI messages. For example, a first problem arises from sending all the parameters for all the frames in one SEI message. Specifically, to support generative compression in the current HEVC or VVC standard, it is proposed to encode the first frame that is so called key frame as an intra picture by using HEVC or VVC standard. All the existing coding tools in the standard and encoder optimization method can be applied. And for the following frames, instead of directly encoding them by using conventional encoder, the features to be used for frame generation are abstracted and signaled in the bitstream. The generated video includes but is limited to a face video or a human body video. Thus, a SEI message was proposed. The features are signaled in the proposed SEI message. After decoding the key frame, the decoder also decodes the SEI message to get the features and generate the following frames based on the first key frame and the features. As there are multiple following frames to be generated, all of them may have different features. In this disclosure, the features needed for one frame generation are called a set of feature parameters. So the number of sets of features parameters to be signaled is the same as the number of frames in the video sequence to be generated.

Figure 14:
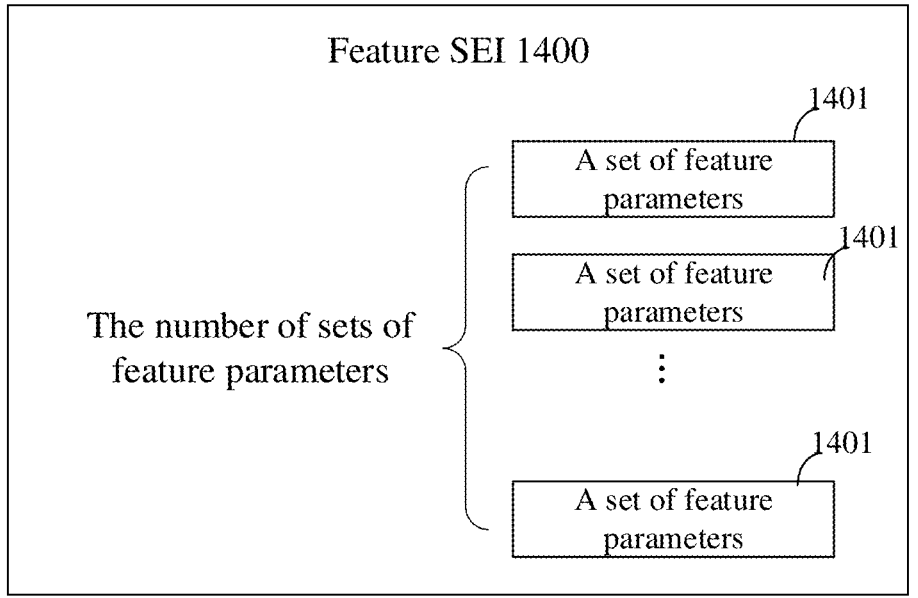
FIG. 14 illustrates an exemplary SEI message with multiple sets of feature parameters, according to some embodiments of the present disclosure.
Figure 15:
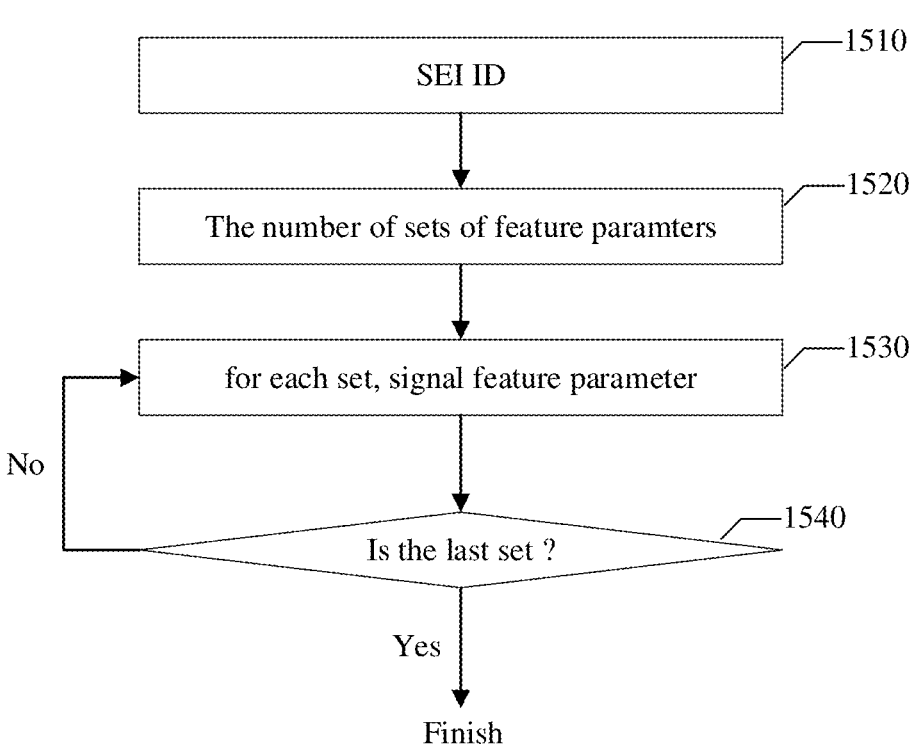
FIG. 15 illustrates a syntax signaling process for one SEI message with multiple sets of feature parameters, according to some embodiments of the present disclosure.

One way to signal the multiple sets of feature parameters is to send all the parameters needed in one SEI message. FIG. 14 illustrates an exemplary SEI message 1400 with multiple sets of feature parameters, according to some embodiments of the present disclosure. As shown in FIG. 14, one SEI message 1400 contains the multiple sets of feature parameters 1401. The number of the sets of feature parameters 1401. The number of the sets of feature parameters in the SEI message is the same as the number of the frames to be generated. FIG. 15 illustrates a syntax signaling process 1500 for one SEI message with multiple sets of feature parameters, according to some embodiments of the present disclosure. Referring to FIG. 15, at step 1510, an SEI ID indicating the current SEI message is the feature SEI message for frame generation is signaled. At step 1520, the number of sets of feature parameters is signaled. At step 1530, the feature parameters are signaled for each set is signaled. At step 1540, it is determined whether the latest signaled set is the last set. If it is the last set, then the signaling is finished. If it is not the last set, the signaling process returns to step 1530, it continues to signal the feature parameters.

In current existing signaling process, the encoder determines how many frames to generate before sending the whole SEI message, and the decoder then decodes all the feature parameters before generating the first frame to be generated, which causes quite a lot of delay, especially when the number of frames to be generated is quite large. In some real-time applications or low-delay applications, the encoder sends the feature parameters for each frame in real time, and the decoder also generates the frame in real-time. So sending all the parameters for all the frames in one SEI message to be generated is not suitable for real-time and low-delay application.

A second problem is associated with ensuring the encoder and decoder to use feature analysis models that match each other. Specifically, for generative compression, the features of a non-key picture are extracted by feature analysis model and coded into bitstream. Then, after the decoder decodes the feature from the bitstream, the picture is generated by a generative model with the features as input. So the generative model in the decoder side should match the analysis model in the encoder side; otherwise the picture cannot be correctly generated. In the current design, only features are sent in the SEI message, and there is no information on the model. So the decoder doesn't know which model the encoder used and whether it matches with the generative model.

The present disclosure provides SEI signaling methods to solve one or more of the above-described problems.

In some embodiments, to solve the above-described first problem, methods are provided to signal a set of feature parameters for one frame in one SEI message.

Figure 16:
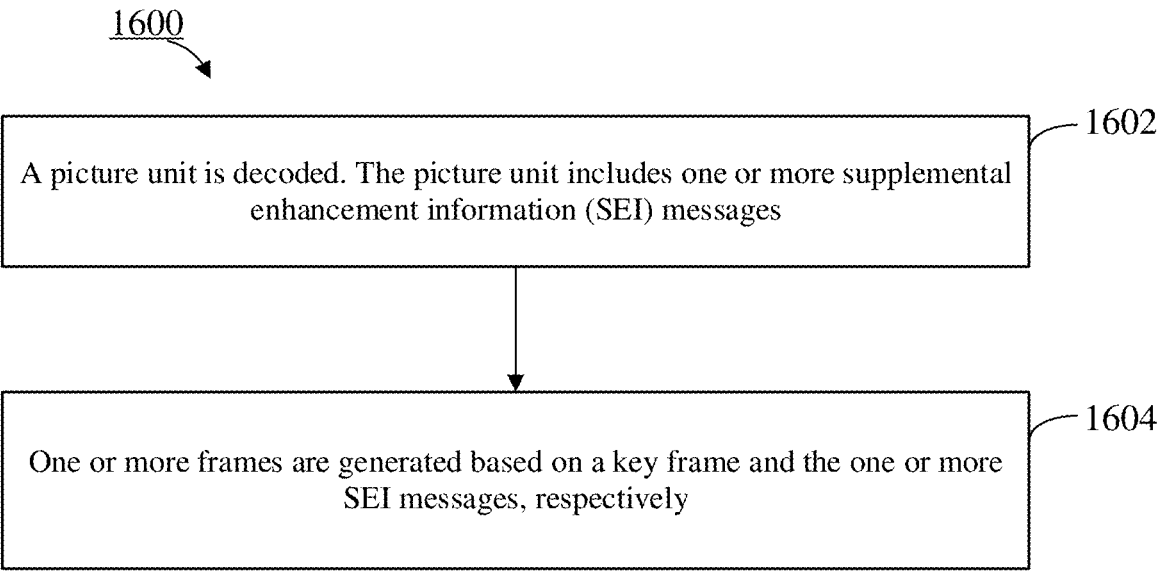
FIG. 16 illustrates a flowchart showing an exemplary method for generating one or more frames, according to some embodiments of the present disclosure.

FIG. 16 illustrates a flowchart showing an exemplary method 1600 for generating one or more frames, according to some embodiments of the present disclosure. Method 1600 can be performed by a decoder (e.g., by process 300A of FIG. 3A or 300B of FIG. 3B) or performed by one or more software or hardware components of an apparatus (e.g., apparatus 400 of FIG. 4). For example, a processor (e.g., processor 402 of FIG. 4) can perform method 1600. In some embodiments, method 1600 can be implemented by a computer program product, embodied in a computer-readable medium, including computer-executable instructions, such as program code, executed by computers (e.g., apparatus 400 of FIG. 4). Referring to FIG. 16, method 1600 may include the following steps 1602 and 1604.

In step 1602, a picture unit is decoded. The picture unit includes one or more supplemental enhancement information (SEI) messages. For example, one picture unit (PU) contains multiple feature SEI messages, and each feature SEI message is used to generate one frame. FIG. 17 illustrates a first set of exemplary picture unit structures 1700, according to some embodiments of the present disclosure. As shown in FIG. 17, for each picture unit (e.g., Picture Unit 0, Picture Unit 1, . . . Picture Unit N), the picture header NAL unit 1701 is decoded first. Then one or more coded slice NAL units 1702 for the key frame (e.g., key frame 0, key frame 1, . . . key frame N) are decoded. In some embodiments, if there is only one coded slice NAL unit 1702, the picture header NAL unit 1701 is optional. That is, in this case, there may be no picture head NAL unit 1701 to be decoded. As one picture unit contains one coded picture according to HEVC and VVC specification, only one key frame (e.g., key frame 0, key frame 1, . . . or key frame N) coded and contained in a picture unit. After coded slice NAL units 1702, the feature SEI message NAL units 1703 are present. There can be one or more feature SEI message NAL units 1703 in the picture unit. Each feature SEI message NAL unit 1703 contains one feature SEI message which is used to generate one frame based on the key frame in the same picture unit. Therefore, the number of frames to be generated is the same as the number of feature SEI message NAL units 1703 in the same picture unit. If a second key frame, for example, key frame 1, is to be coded and signaled in the bitstream, there will be a second picture unit, for example, Picture Unit 1. The second picture unit (e.g., Picture Unit 1) also contains a picture header NAL unit 1701 (if present) and one or more coded slice NAL units 1702 for the second key frame (e.g., key frame 1). After these coded slice NAL units 1702 are decoded, one or more feature SEI messages 1703 are decoded. These feature SEI message NAL units 1603 contains the feature parameters used to generate frames based on the second key frame (e.g., key frame 1). Therefore, in this example, the number of the picture units in the bitstream is the same as key frames coded.

At step 1604, one or more frames are generated based on a key frame and the one or more SEI messages, respectively. For example, referring to FIG. 17, take Picture Unit 0 for example, a first frame is generated based on the key frame 1 and a first SEI message in a feature SEI message NAL unit 1703a, a second frame is generated based on key frame 1 and a second SEI message in a feature SEI message NAL unit 1703b, etc. Therefore, in this example, the feature SEI messages used for frame generation are in the same picture unit of the key frame based on which the frames are generated. In some embodiments, the key frame and the SEI message can be contained in different picture units, which will be described later in the present disclosure.

From the video coding standard point of view, only key frames are the coded pictures and should be output. The generation of frames with the feature SEI messages are the post-processing and frames generated are not the output of the decoder. Therefore, the post-processor should manage the frames decoded by the decoder and the frames generated by the post-processor correctly. In case that only the first frame is coded as key frame, there is only one picture unit in the whole CLVS.

As multiple frames can be generated with the multiple feature SEI messages contained in one PU, to distinguish the display order of these generated frames, a picture order count pic_order_cnt is signaled in the feature SEI message. FIG. 18 illustrates a Table 5 showing an exemplary feature SEI message syntax 1800, according to some embodiments of the present disclosure. Referring to FIG. 18, a picture order count pic_order_cnt 1801 is signaled in the feature SEI message. Picture order count pic_order_cnt specifies the display order count modulo 1<<31 of the picture generated with the current SEI message. Thus, the generated frames can be displayed in the correct order that is specified by pic_order_cnt even when the SEI messages are transmitted in a random order. It provides the transmission systems with the flexibility for sending the feature SEI message. In some embodiments, the picture order count can be coded with a fixed length code or a variable length code. In some embodiments, the picture order count is divided into most significant bit (MSB) and least significant bit (LSB) and only LSB is signaled in the bitstream to save the signaling cost. The MSB can be derived according to the changes of the LSB of the picture order count signaled in the two consecutive SEI messages. In this example, at a decoder side, the decoder is configured to decode the LSB first, and then derive the MSB according to the change between a first LSB of picture order count decoded in a previous SEI message and a second LSB in a current SEI message.

Since one picture unit contains only one feature SEI message that can be used to generate one frame, the number of the frames is the same as the number of the picture units. FIG. 19 illustrates a second set of exemplary picture unit structures 1900, according to some embodiments of the present disclosure. As shown in FIG. 19, in this example, as the first frame is actually coded as the key frame, the first picture unit, i.e., Picture Unit 0, contains the coded slice NAL unit 1902 for the key frame 1910. And no feature SEI message NAL units are in the first picture unit, i.e., Picture Unit 0. In the following picture units (e.g., Picture Unit 1, . . . Picture Unit N), each picture unit contains a feature SEI message NAL unit 1903, and the feature SEI message in the feature SEI message NAL unit 1903 is used to generate a frame based on the key frame 1910 in the first picture unit, i.e., Picture Unit 0.

Since HEVC and VVC specifies that each picture unit contains one coded picture, the frame to be generated is not the coded picture, a dummy picture 1920 is coded for the following picture unit (e.g., Picture Unit 1 . . . Picture Unit N). To save the bit overhead transmitted in the bitstream, in some embodiments, all the samples of the dummy picture may be set to a same value, e.g., 1<<(bitdpeth−1), where bitdepth is the bit-depth of the picture sample. In some embodiments, encoder may directly signal the slice data with no CU partitioning, the first most probable mode (MPM) and zero residual to skip as many slice data level syntax elements as possible, and keep the signaled syntax elements with the same picture among different blocks. Therefore, the decoder can decode the dummy picture with the first most probable mode (MPM), the zero residual, and the slice data with no code unit partitioning, and no more slice data level syntax element to be decoded.

In some embodiments, as context adaptive binary arithmetic coding (CABAC) is used, if the encoder always signals the same value for the same syntax element, the bit overhead can be very small. As the picture header NAL unit (or picture header structure in slice header) and slice header are mandatory for each coded picture, the encoder can use single slice for the dummy picture to reduce the bit overhead for slice header. Besides, the encoder may disable all the inter coding tools in sequence parameter set (SPS) and code the dummy picture as intra slice to skip all the inter slice or inter prediction related control flags, configuration or parameters in picture header and slice header. Those inter coding tools with parameter being signaled in picture or slice level can also be disabled, so that related the parameter signaling can be skipped. For example, adaptive loop filter (ALF), cross-component adaptive loop filter (CCALF), luma mapping with chroma scaling (LUCS), scaling list, virtual boundary, CU delta QP, deblocking parameter present, bi-directional optical flow (BDOF), prediction refinement with optical flow (PROF), decoder side motion vector refinement (DMVR) all can be disabled. With the syntax elements which have to be signaled being signaled, the slice header and the picture header take about 2 to 3 bytes according to VVC syntax structure. Compared with bit cost of feature SEI message itself, the bit cost of the dummy picture is relatively small.

In this example, referring to FIG. 19, the decoder decodes the dummy picture 1920, and generates the frame based on the SEI message of feature SEI message NAL unit 1903 in the Picture Unit 1 with the key frame 1910 in Picture Unit 0. Then, dummy picture is replaced with the frame generated, and the dummy picture is discarded. In some examples, since the dummy pictures are not to be used, the decoder may skip the dummy picture decoding and only generate the frames to be generated.

In the above method, the dummy picture is coded and transmitted in the bitstream but is discarded in decoder side. Thus, it takes some bits to signal the dummy picture. In some embodiments, the encoder sends a NAL unit with a special NAL unit type to represent a coded picture but without any payload to save the bits.

FIG. 20 illustrates a third set of exemplary picture unit structures 2000, according to some embodiments of the present disclosure. As shown in FIG. 20, one picture unit contains one coded picture. For the first picture unit, i.e., Picture Unit 0, it contains the first frame of the video sequences which is coded as key frame 2010. No feature SEI message NAL units are present in the first picture unit, i.e., Picture Unit 0. In the following picture units (e.g., Picture Unit 1 . . . Picture Unit N), each picture unit contains a coded picture and a feature SEI message NAL unit 2003. The coded picture is represented by the empty picture NAL unit 2004 and feature SEI message NAL unit 2003 contains the feature SEI message that is used to generate a frame. The empty picture NAL unit 2004 indicates an empty picture 2020.

At the decoder side, when receiving the empty picture NAL unit 2004, the decoder knows it is a new picture unit and the empty picture NAL unit 2004 can be directly discarded by the decoder. No decoding process for the current picture needs to be performed. After decoding feature SEI message, the decoder generates the frame with the feature parameters signaled based on the key frame 2010, and output the frame generated.

Unspecified NAL unit type in HEVC or VVC can be used for empty picture NAL unit 2004. For example, in VVC, a NAL unit with nal_unit_type value between 28 and 31 is unspecified. Thus, the application may use nal_unit_type between 28 and 31 as the NAL unit type of an empty picture NAL unit 2004. The size of the empty picture NAL unit (NumBytesInNalUnit) is set to 2 bytes which is the same size of NAL unit header. Therefore, there is no RBSP in empty picture NAL unit.

In this example, the encoder sends an empty NAL unit 2004 with nal_unit_type between 28 and 31 which only has NAL unit header as a coded picture. The empty NAL unit 2004 is followed by a feature SEI message NAL unit 2003 and the feature SEI message NAL unit 2003 contains a feature SEI message which is used to generate a frame. The decoder decodes the NAL unit with nal_unit_type between 28 and 31 and discards the empty NAL unit 2004. Then the decoder decodes the feature SEI message NAL unit 2003 and determines the feature parameters. Based on the key frame 2010, which was already decoded, the decoder generates the frame with the feature parameters.

Since a picture unit must contain a coded picture that comprises of one or more VCL NAL units, an empty picture NAL unit is transmitted for saving the bits dedicated on the coded picture in the above embodiments. In some other embodiments, a picture unit may have zero or one coded picture. That is to say, the picture coded is not mandatory for a picture unit. In that case, to determine the first NAL unit of a new picture unit, a new NAL unit, picture unit delimiter (PUD) is proposed in this example. The PUD is used to delimit the picture unit, and it is optional. There can be at most one PUD NAL unit in a picture. When the picture unit doesn't have any VCL NAL unit, there must be a PUD in the picture unit. When a PUD unit is present in a picture unit, it shall be the first NAL unit of the picture unit.

By introducing the PUD, even the empty coded picture NAL unit can be skipped. The encoder sends a PUD for starting a picture unit and then sends a feature SEI message NAL unit in the picture unit for frame generation. When the decoder decodes the PUD, a new picture unit is determined to be decoded. The feature SEI message NAL unit before the PUD in the bitstream is determined to be contained in a previous picture unit and the feature SEI message NAL unit after the PUD are determined to be contained in a next picture unit. By using PUD, the decoder can clearly determine the picture unit and know the picture unit which the feature SEI message decoded being contained in. Consequently, the frame generated with the feature SEI message is output for a current picture unit.

FIG. 21 illustrates a fourth set of exemplary picture unit structures 2100, according to some embodiments of the present disclosure. For the first picture unit, i.e., Picture Unit 0, it contains the first frame of the video sequences which is coded as key frame 2110. No feature SEI message NAL units are present in the first picture unit, i.e., Picture Unit 0. In the following picture units (e.g., Picture Unit 1, . . . Picture Unit N), each picture unit contains a PUD 2104 and a feature SEI message NAL unit 2103. There is no coded picture in these picture units (e.g., Picture Unit 1, . . . Picture Unit N), and the picture unit can be determined by PUD 2104. A feature SEI message NAL unit 2103 contains a feature SEI message which can be used to generate a frame, and the frame generated is treated as the decoded picture in the picture unit (e.g., Picture Unit 1, . . . Picture Unit N) containing the feature SEI message NAL unit 2103.

FIG. 22 illustrates a Table 6 showing an exemplary syntax of PUD RBSP 2200, according to some embodiments of the present disclosure. The semantics are described below. FIG. 23 illustrates a Table 7 showing an exemplary interpretation of pud_pic_type 2300, according to some embodiments of the present disclosure.

pud_irap_or_gdr_flag equal to 1 specifies that the picture unit containing the PUD is an intra random access point (IRAP) or gradual decoding refresh (GDR) picture unit. aud_irap_or_gdr_flag equal to 0 specifies that the picture unit containing the PUD is not an IRAP or GDR picture unit.

pud_pic_type indicates that the sh_slice_type values for all slices of the coded pictures in the picture unit containing the PUD NAL unit are members of the set listed in Table 7, shown in FIG. 23, for the given value of pud_pic_type. The value of pud_pic_type is equal to 0, 1 or 2. Other values of pud_pic_type are reserved for future use. Decoders ignore reserved values of pud_pic_type.

In some embodiments, to solve the above-described second problem (i.e., ensuring the encoder and decoder uses matching feature analysis models to extract features of non-key pictures), various mechanisms can be used to inform the decoder about the feature analysis model by the encoder. In some embodiments, it is proposed to send a key in the SEI message to indicate the analysis model that is used to extract the features signaled in the SEI message. FIG. 24 illustrates a Table 8 showing an exemplary feature SEI message syntax 2400, according to some embodiments of the present disclosure. As shown in FIG. 24, a key 2401 is signaled in the SEI message. At the decoder side, the key is used to identify the analysis network used to generate the syntax elements of the current feature SEI message. The key may also be used to determine whether the analysis model at the encoder matches with the generative model stored at the decoder. The generative model at the decoder may use the SEI message to generate the video pictures only if it recognizes the key. The value of the key may be specified by the applications that require matching models to be used at the encoder and the decoder. For such applications, if the parameters in an SEI message are extracted at the encoder with an analysis model that does not match the generative model at the decoder, the generative model can ignore the received SEI message.

In some embodiments, some applications other than generative compression do not require the generative model (decoder side) and analysis model (encoder side) to match each other. For example, in use cases such as user-specified animation or filtering, the decoder only needs to perform face animation or facial filtering. In these cases, there is no need to generate the pictures, so it is not necessary for a decoder to have a generative model matching the encoder's analysis model. Instead, the decoder can use any model to change or filter the faces in the pictures or videos. As the encoder has the uncoded face images, it can extract more precise facial landmarks or keypoints, resulting in higher quality facial animation than the decoder side. This allows the sender to have better control over the quality of animated or filtered facial pictures. The facial landmarks or keypoints extracted in the encoder side can be signaled in the feature SEI message, which can be signaled using the methods proposed in this disclosure. That is, rather than using the picture generation in decoder side, the feature SEI message is used to provide the landmarks or keypoints information to help face animation/filtering.

In some embodiments, a non-transitory computer-readable storage medium storing a bitstream is also provided. The bitstream can include encoded syntax elements for implementing the disclosed signaling methods for supplemental enhancement information (SEI) messages.

The embodiments may further be described using the following clauses:

1. A method of decoding a bitstream to get one or more pictures for a video stream, the method comprising:
   receiving a bitstream; and
   decoding the bitstream to get one or more pictures,
   wherein the decoding comprises:
      decoding a picture unit comprising one or more supplemental enhancement information (SEI) messages; and
      generating the one or more pictures based on a key picture and the one or more SEI messages, respectively.

2. The method according to clause 1, wherein the key picture is decoded by the decoder based on the receiving bitstream.

3. The method according to clause 1, wherein the key picture and the one or more SEI message are in a same picture unit.

4. The method according to clause 3, wherein the SEI message comprises a count identifying the SEI message within the picture unit.

5. The method according to clause 4, wherein the count indicates an order of the one or more pictures corresponding to the SEI message.

6. The method according to clause 2, wherein a first picture unit comprises one SEI message, and a second picture unit comprises the key picture.

7. The method according to clause 6, wherein the first picture unit further comprises a coded slice network abstraction layer (NAL) unit for a coded picture.

8. The method according to clause 7, further comprising:
   decoding the coded picture to obtain a decoded picture;
   generating a picture based on the key picture and the SEI messages contained in the first picture unit; and
   outputting the generated picture instead of the decoded picture.

9. The method according to clause 7, wherein a sample of the coded picture is set to a fixed value.

10. The method according to clause 7, wherein the decoding further comprises:
   decoding the coded picture with a first most probable mode (MPM), zero residual, and slice data with no code unit partitioning.

11. The method according to clause 7, wherein signaled syntax elements are the same for different blocks in the coded picture.

12. The method according to clause 7, wherein one single slice is used for the coded picture.

13. The method according to clause 7, wherein all inter coding tools in sequence parameter set (SPS) are disabled for the coded picture.

14. The method according to clause 13, wherein the inter coding tools with parameter being signaled in picture or slice level are disabled.

15. The method according to clause 6, wherein the first picture unit comprises an empty picture NAL unit indicating an empty picture.

16. The method according to clause 15, wherein the decoding further comprises: skipping a decoding process for the empty picture in the empty picture NAL unit.

17. The method according to clause 15, wherein the empty picture NAL unit does not comprise a raw byte sequence payload (RBSP).

18. The method according to clause 15, wherein the empty picture NAL unit is specified with an NAL unit type.

19. The method according to clause 1, wherein the bitstream comprises a picture unit delimiter (PUD) indicating following NAL units belong to a next picture unit.

20. The method according to clause 19, wherein the decoding further comprises:

decoding a flag in the PUD indicating whether the following picture unit is an intra random access point (IRAP) picture unit or a gradual decoding refresh (GDR) picture unit; and decoding an index in the PUD indicating a picture type of a coded picture in the following picture unit.

21. A method of decoding a bitstream to get one or more pictures for a video stream, the method comprising:

receiving a bitstream; and decoding the bitstream to get one or more pictures, wherein the decoding comprises:

decoding a supplemental enhancement information (SEI) message;

determining, based on the decoded SEI message, whether a generative model in a decoder matches an analysis model in an encoder; and in response to the generative model matching the analysis model, generating a picture based on the SEI message by using the generative model.

22. The method according to clause 21, wherein determining whether the generative model matches the analysis model comprises:

decoding a key signaled in the bitstream; and determining, based on a value of the key, whether the generative model matches the analysis model.

23. A method of decoding a bitstream to get one or more pictures for a video stream, the method comprising:

receiving a bitstream; and decoding the bitstream to get one or more pictures, wherein the decoding comprises:

decoding a supplemental enhancement information (SEI) message, wherein the SEI message comprises landmarks or keypoints; and animating or filtering one or more pictures using the landmarks or the keypoints in the decoded SEI message.

24. A method of encoding a video sequence into a bitstream, the method comprising:

receiving a video sequence;

encoding one or more pictures of the video sequence; and generating a bitstream, wherein the encoding comprises:

encoding one or more supplemental enhancement information (SEI) messages corresponding to one or more pictures, respectively; and encoding the one or more SEI messages in a picture unit.

25. The method according to clause 24, wherein the encoding further comprises:

encoding a key picture in the picture unit.

26. The method according to clause 24, wherein the encoding further comprises:

encoding a count identifying the SEI message within the picture unit in the SEI message.

27. The method according to clause 26, wherein the count indicates an order of the one or more pictures corresponding to the SEI message.

28. The method according to clause 24, wherein the encoding further comprising:

encoding one SEI message in a first picture unit; and encoding a key picture in a second picture unit.

29. The method according to clause 28, wherein the encoding further comprises:

encoding a slice network abstraction layer (NAL) unit for a picture in the first picture unit.

30. The method according to clause 29, wherein a sample of the picture is set to a fixed value.

31. The method according to clause 29, wherein the encoding further comprises:

encoding the picture with a first most probable mode (MPM), zero residual, and slice data with no code unit partitioning.

32. The method according to clause 29, wherein signaled syntax elements are the same for different blocks in the picture.

33. The method according to clause 29, wherein one single slice is used for the picture.

34. The method according to clause 29, wherein the encoding further comprises:

disabling all inter coding tools in sequence parameter set (SPS) for the picture.

35. The method according to clause 34, wherein the encoding further comprises:

disabling the inter coding tools with parameter in picture or slice level.

36. The method according to clause 28, wherein the first picture unit comprises an empty picture NAL unit indicating an empty picture.

37. The method according to clause 36, wherein the encoding further comprises:

skipping an encoding process for the empty picture in the empty picture NAL unit.

38. The method according to clause 37, wherein the empty picture NAL unit does not comprise a raw byte sequence payload (RBSP).

39. The method according to clause 37, wherein the empty picture NAL unit is specified with an NAL unit type.

40. The method according to clause 24, wherein the encoding further comprises:

encoding a picture unit delimiter (PUD) indicating following NAL units belong to a next picture unit in the bitstream.

41. The method according to clause 40, wherein the encoding further comprises:

encoding a flag in the PUD to indicate whether the following picture unit is an intra random access point (IRAP) picture unit or a gradual decoding refresh (GDR) picture unit; and encoding an index in the PUD to indicate a picture type of a coded picture in the following picture unit.

42. The method according to clause 24, wherein the encoding further comprises:

encoding a key indicating an analysis model in the encoder in the bitstream.

43. The method according to clause 24, wherein the SEI message comprises landmarks or keypoints.

44. A non-transitory computer readable storage medium storing a bitstream of a video, the bitstream comprising:

a picture unit comprising one or more supplemental enhancement information (SEI) messages, wherein the one or more SEI messages are used for generating one or more pictures, respectively.

45. The non-transitory computer readable storage medium according to clause 44, wherein the picture unit further comprises a key picture.

46. The non-transitory computer readable storage medium according to clause 45, wherein the picture unit further comprises a count identifying the SEI message within the picture unit in the SEI message.

47. The non-transitory computer readable storage medium according to clause 46, wherein the count indicates an order of the one or more pictures corresponding to the SEI message.

48. The non-transitory computer readable storage medium according to clause 44, wherein the bitstream comprise:

one or more first picture units, each of the first picture unit comprising one SEI message; and a second picture unit comprising a key picture.

49. The non-transitory computer readable storage medium according to clause 48, wherein the first picture unit further comprises a coded slice network abstraction layer (NAL) unit for a coded picture.

50. The non-transitory computer readable storage medium according to clause 49, wherein a sample of the coded picture is set to a fixed value.

51. The non-transitory computer readable storage medium according to clause 49, wherein the coded picture with a first most probable mode (MPM), zero residual, and slice data with no code unit partitioning.

52. The non-transitory computer readable storage medium according to clause 49, wherein the bitstream further comprises same syntax elements for different blocks in the coded picture.

53. The non-transitory computer readable storage medium according to clause 49, wherein one single slice is used for the coded picture.

54. The non-transitory computer readable storage medium according to clause 49, wherein all inter coding tools in sequence parameter set (SPS) are disabled for the coded picture.

55. The non-transitory computer readable storage medium according to clause 54, wherein the inter coding tools with parameter being signaled in picture or slice level are disabled.

56. The non-transitory computer readable storage medium according to clause 48, wherein the first picture unit comprises an empty picture NAL unit indicating an empty picture.

57. The non-transitory computer readable storage medium according to clause 56, the empty picture NAL unit does not comprise a raw byte sequence payload (RBSP).

58. The non-transitory computer readable storage medium according to clause 56, wherein the empty picture NAL unit is specified with an NAL unit type.

59. The non-transitory computer readable storage medium according to clause 44, wherein the bitstream further comprises a picture unit delimiter (PUD) indicating following NAL units belong to a next picture unit in the bitstream.

60. The non-transitory computer readable storage medium according to clause 59, wherein the PUD further comprises:

a flag indicating whether the following picture unit is an intra random access point (IRAP) picture unit or a gradual decoding refresh (GDR) picture unit; and an index indicating a picture type of a coded picture in the following picture unit containing the PUD.

61. The non-transitory computer readable storage medium according to clause 44, wherein the bitstream further comprises a key indicating an analysis model in an encoder.

62. The non-transitory computer readable storage medium according to clause 44, wherein the SEI message comprises landmarks or keypoints.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above-described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above-described modules/units may be combined as one module/unit, and each of the above-described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A method of decoding a bitstream to get one or more pictures for a video stream, the method comprising:
   receiving a bitstream; and
   decoding the bitstream to get the one or more pictures, wherein the decoding comprises:
   decoding a picture unit comprising one or more supplemental enhancement information (SEI) messages; and
   generating the one or more pictures based on a key picture and the one or more SEI messages, respectively;
   wherein the bitstream comprises a picture unit delimiter (PUD) indicating that following NAL units belong to a next picture unit.

2. The method according to claim 1, wherein the key picture is decoded by the decoder based on the receiving bitstream.

3. The method according to claim 1, wherein the key picture and the one or more SEI message are in a same picture unit.

4. The method according to claim 2, wherein a first picture unit comprises one SEI message, and a second picture unit comprises the key picture.

5. The method according to claim 4, wherein the first picture unit further comprises a coded slice network abstraction layer (NAL) unit for a coded picture.

6. The method according to claim 5, further comprising:
   decoding the coded picture to obtain a decoded picture;
   generating a picture based on the key picture and the SEI messages contained in the first picture unit; and
   outputting the generated picture instead of the decoded picture.

7. The method according to claim 1, further comprising:
   decoding a flag in the PUD indicating whether the following picture unit is an intra random access point (IRAP) picture unit or a gradual decoding refresh (GDR) picture unit; and
   decoding an index in the PUD indicating a picture type of a coded picture in the following picture unit.

8. A method of encoding a video sequence into a bitstream, the method comprising:
   receiving a video sequence;
   encoding one or more pictures of the video sequence; and
   generating a bitstream,
   wherein the encoding comprises:
   encoding one or more supplemental enhancement information (SEI) messages corresponding to one or more pictures, respectively; and
   encoding the one or more SEI messages in a picture unit;
   wherein the bitstream comprises a picture unit delimiter (PUD) indicating that following NAL units belong to a next picture unit.

9. The method according to claim 8, wherein the encoding further comprises:
   encoding a key picture in the picture unit.

10. The method according to claim 8, wherein the encoding further comprising:
   encoding one SEI message in a first picture unit; and
   encoding a key picture in a second picture unit.

11. The method according to claim 10, wherein the encoding further comprises:
   encoding a slice network abstraction layer (NAL) unit for a picture in the first picture unit.

12. The method according to claim 8, wherein the encoding further comprises:
   encoding a flag in the PUD to indicate whether the following picture unit is an intra random access point (IRAP) picture unit or a gradual decoding refresh (GDR) picture unit; and
   encoding an index in the PUD to indicate a picture type of a coded picture in the following picture unit.

13. The method according to claim 8, further comprising:
   storing the bitstream that is generated based on the encoding.

14. A method for signaling a bitstream, the method comprising:
   receiving a video sequence;
   encoding the video sequence by:
   encoding one or more supplemental enhancement information (SEI) messages corresponding to one or more pictures, respectively; and
   encoding the one or more SEI messages in a picture unit; and
   signaling a bitstream that is generated based on the encoding;
   wherein the bitstream comprises a picture unit delimiter (PUD) indicating that following NAL units belong to a next picture unit.

15. The method according to claim 14, wherein the encoding further comprises:
   encoding a key picture in the picture unit.

16. The method according to claim 14, wherein the encoding further comprising:
   encoding one SEI message in a first picture unit; and
   encoding a key picture in a second picture unit.

17. The method according to claim 16, wherein the encoding further comprises:
   encoding a slice network abstraction layer (NAL) unit for a picture in the first picture unit.

18. The method according to claim 14, wherein the encoding further comprises:
   encoding a flag in the PUD to indicate whether the following picture unit is an intra random access point (IRAP) picture unit or a gradual decoding refresh (GDR) picture unit; and
   encoding an index in the PUD to indicate a picture type of a coded picture in the following picture unit.

* * * * *